US009693214B2

(12) United States Patent
Hyde et al.

(10) Patent No.: US 9,693,214 B2
(45) Date of Patent: Jun. 27, 2017

(54) PROTOCOLS FOR FACILITATING BROADER ACCESS IN WIRELESS COMMUNICATIONS

(71) Applicant: Elwha LLC, Bellevue, WA (US)

(72) Inventors: Roderick A. Hyde, Redmond, WA (US); Royce A. Levien, Lexington, MA (US); Richard T. Lord, Tacoma, WA (US); Robert W. Lord, Seattle, WA (US); Mark A. Malamud, Seattle, WA (US); Clarence T. Tegreene, Mercer Island, WA (US)

(73) Assignee: Elwha LLC, Bellevue, WA (US)

( * ) Notice: Subject to any disclaimer, the term of this patent is extended or adjusted under 35 U.S.C. 154(b) by 558 days.

(21) Appl. No.: 13/839,536

(22) Filed: Mar. 15, 2013

(65) Prior Publication Data

US 2014/0273931 A1    Sep. 18, 2014

(51) Int. Cl.
*H04W 4/02*     (2009.01)
*H04W 40/24*    (2009.01)
*H04L 29/06*    (2006.01)
*H04W 4/24*     (2009.01)
*H04M 15/00*    (2006.01)

(52) U.S. Cl.
CPC .............. *H04W 4/24* (2013.01); *H04L 63/02* (2013.01); *H04M 15/82* (2013.01); *H04W 4/02* (2013.01); *H04W 4/021* (2013.01); *H04W 40/24* (2013.01)

(58) Field of Classification Search
CPC ....... H04W 4/24; H04W 92/02; H04W 88/06; H04M 2215/2026; H04M 17/00; H04M 15/00
USPC ...................... 455/406–408, 422.1, 405, 436
See application file for complete search history.

(56) References Cited

U.S. PATENT DOCUMENTS

| | | | |
|---|---|---|---|
| 4,149,146 A | 4/1979 | Ebihara et al. | |
| 4,965,738 A | 10/1990 | Bauer et al. | |
| 5,390,293 A | 2/1995 | Nishioka et al. | |
| 5,568,541 A * | 10/1996 | Greene ................ | H04M 15/00 379/111 |
| 6,101,378 A * | 8/2000 | Barabash et al. ............ | 455/406 |
| 6,119,009 A | 9/2000 | Baranger et al. | |
| 6,134,014 A | 10/2000 | Tzu et al. | |
| 6,167,398 A | 12/2000 | Wyard et al. | |
| 6,353,663 B1 | 3/2002 | Stevens et al. | |
| 6,377,806 B1 | 4/2002 | Tokuyoshi | |
| 6,380,910 B1 | 4/2002 | Moustakas et al. | |
| 6,424,729 B1 | 7/2002 | Soon | |
| 6,629,136 B1 | 9/2003 | Naidoo | |

(Continued)

FOREIGN PATENT DOCUMENTS

EP       1544787 A1    6/2005
GB    2 445 778 A      7/2008

(Continued)

OTHER PUBLICATIONS

PCT International Search Report; International App. No. PCT/US13/78330; Apr. 23, 2014; pp. 1-2.

(Continued)

*Primary Examiner* — Marisol Figueroa

(57) ABSTRACT

Structures and protocols are presented for signaling a status or decision concerning a wireless service or device within a region to a network participant or other communication device (smartphone or vehicle, e.g.).

20 Claims, 25 Drawing Sheets

(56) References Cited

U.S. PATENT DOCUMENTS

| | | |
|---|---|---|
| 6,788,927 B2 | 9/2004 | Pohutsky et al. |
| 6,795,700 B2 | 9/2004 | Karaoguz et al. |
| 6,898,430 B1 | 5/2005 | Liberti et al. |
| 6,934,316 B2 | 8/2005 | Cornwall et al. |
| 6,950,660 B1 | 9/2005 | Hsu et al. |
| 6,958,729 B1 | 10/2005 | Metz |
| 7,149,533 B2 | 12/2006 | Laird et al. |
| 7,218,190 B2 | 5/2007 | Engheta et al. |
| 7,237,261 B1 | 6/2007 | Huber et al. |
| 7,245,913 B1 | 7/2007 | Nguyen et al. |
| 7,254,123 B2 | 8/2007 | Jukarainen |
| 7,260,203 B2 | 8/2007 | Holt et al. |
| 7,305,079 B1 | 12/2007 | Forte |
| 7,344,063 B2 | 3/2008 | Wagner et al. |
| 7,392,017 B2 | 6/2008 | Chu et al. |
| 7,401,243 B2 | 7/2008 | Knepper et al. |
| 7,424,316 B1 | 9/2008 | Boyle |
| 7,443,787 B2 | 10/2008 | Karino et al. |
| 7,466,986 B2 | 12/2008 | Halcrow et al. |
| 7,477,903 B2 | 1/2009 | Wilcock et al. |
| 7,516,092 B2 | 4/2009 | Upendran et al. |
| 7,519,373 B2 | 4/2009 | Kennedy, Jr. et al. |
| 7,522,992 B2 | 4/2009 | Obradovich et al. |
| 7,532,898 B2 | 5/2009 | Halcrow et al. |
| 7,567,305 B2 | 7/2009 | Joo |
| 7,590,708 B2 | 9/2009 | Hsu |
| 7,593,812 B2 | 9/2009 | Obradovich et al. |
| 7,644,055 B2 | 1/2010 | Furst et al. |
| 7,646,712 B2 | 1/2010 | Cohen et al. |
| 7,650,319 B2 | 1/2010 | Hoffberg et al. |
| 7,664,720 B1 | 2/2010 | Freeman et al. |
| 7,716,585 B2 | 5/2010 | Glass |
| 7,733,223 B2 | 6/2010 | Levien et al. |
| 7,743,334 B2 | 6/2010 | Rider |
| 7,761,505 B2 | 7/2010 | Krzyzanowski et al. |
| 7,787,693 B2 | 8/2010 | Siegemund |
| 7,787,896 B2 | 8/2010 | Kundu et al. |
| 7,804,954 B2 | 9/2010 | Han et al. |
| 7,813,716 B2 | 10/2010 | Malackowski et al. |
| 7,821,986 B2 | 10/2010 | Thomson et al. |
| 7,831,559 B1 | 11/2010 | Mohan et al. |
| 7,835,314 B2 | 11/2010 | Yee et al. |
| 7,847,739 B2 | 12/2010 | Achour et al. |
| 7,848,292 B2 | 12/2010 | Bl et al. |
| 7,853,268 B2 | 12/2010 | Karaoguz et al. |
| 7,856,137 B2 | 12/2010 | Yonezawa et al. |
| 7,860,648 B2 | 12/2010 | Jung et al. |
| 7,869,131 B2 | 1/2011 | Bowers et al. |
| 7,881,992 B1 | 2/2011 | Seaman et al. |
| 7,882,307 B1 | 2/2011 | Wentzlaff et al. |
| 7,886,335 B1 | 2/2011 | Chickering et al. |
| 7,908,518 B2 | 3/2011 | West, Jr. et al. |
| 7,916,071 B2 | 3/2011 | Harper |
| 7,920,853 B2 | 4/2011 | Purontaus et al. |
| 7,924,927 B1 | 4/2011 | Boesjes |
| 7,925,250 B2 | 4/2011 | Redpath |
| 7,925,995 B2 | 4/2011 | Krumm et al. |
| 7,928,900 B2 | 4/2011 | Fuller et al. |
| 7,930,389 B2 | 4/2011 | Jung et al. |
| 7,949,191 B1 | 5/2011 | Ramkumar et al. |
| 7,957,418 B2 | 6/2011 | Wijayanathan et al. |
| 7,961,076 B2 | 6/2011 | Kelley et al. |
| 7,965,997 B2 | 6/2011 | Sposato et al. |
| 8,000,314 B2 | 8/2011 | Brownrigg et al. |
| 8,000,528 B2 | 8/2011 | Ming et al. |
| 8,004,556 B2 | 8/2011 | Rodman et al. |
| 8,004,971 B1 | 8/2011 | Szabo et al. |
| 8,005,911 B2 | 8/2011 | Jhanji |
| 8,010,230 B2 | 8/2011 | Zini et al. |
| 8,018,856 B2 | 9/2011 | Matityahu et al. |
| 8,024,482 B2 | 9/2011 | Hoogerwerf et al. |
| 8,032,149 B2 | 10/2011 | Kennedy et al. |
| 8,037,126 B2 | 10/2011 | Plamondon |
| 8,045,957 B2 | 10/2011 | Dinh et al. |
| 8,049,664 B2 | 11/2011 | Millard et al. |
| 8,054,856 B2 | 11/2011 | Sala et al. |
| 8,059,011 B2 | 11/2011 | Van Wyk et al. |
| 8,059,650 B2 | 11/2011 | Shetty et al. |
| 8,059,788 B2 | 11/2011 | Allen, Jr. et al. |
| 8,060,017 B2 | 11/2011 | Schlicht et al. |
| 8,065,357 B2 | 11/2011 | Cocotis et al. |
| 8,065,404 B2 | 11/2011 | Jung et al. |
| 8,068,836 B2 | 11/2011 | Voyer et al. |
| 8,069,275 B2 | 11/2011 | Peck et al. |
| 8,072,291 B2 | 12/2011 | Itoh et al. |
| 8,081,138 B2 | 12/2011 | Wu et al. |
| 8,082,576 B2 | 12/2011 | Flynn et al. |
| 8,086,239 B2 | 12/2011 | Elmaleh |
| 8,094,009 B2 | 1/2012 | Allen et al. |
| 8,095,508 B2 | 1/2012 | Chamberlain et al. |
| 8,098,753 B2 | 1/2012 | Feher |
| 8,104,892 B2 | 1/2012 | Hillis et al. |
| 8,108,145 B2 | 1/2012 | Karaoguz et al. |
| 8,108,501 B2 | 1/2012 | Birnie et al. |
| 8,111,622 B2 | 2/2012 | Cohen et al. |
| 8,121,648 B2 | 2/2012 | Kezys |
| 8,125,896 B2 | 2/2012 | Cohen et al. |
| 8,126,867 B2 | 2/2012 | Jung et al. |
| 8,145,219 B2 | 3/2012 | Karaoguz et al. |
| 8,145,566 B1 | 3/2012 | Ahuja et al. |
| 8,145,975 B2 | 3/2012 | Lin et al. |
| 8,149,113 B2 | 4/2012 | Diem |
| 8,150,796 B2 | 4/2012 | Jung et al. |
| 8,155,077 B2 | 4/2012 | Grayson |
| 8,160,304 B2 | 4/2012 | Rhoads et al. |
| 8,161,542 B2 | 4/2012 | Tiwari |
| 8,165,091 B2 | 4/2012 | Nix |
| 8,165,600 B2 | 4/2012 | Walter |
| 8,166,237 B1 | 4/2012 | Atsatt et al. |
| 8,169,311 B1 | 5/2012 | Breed |
| 8,180,328 B2 | 5/2012 | Van De Groenendaal |
| 8,184,580 B2 | 5/2012 | Wilhelmsson et al. |
| 8,184,656 B2 | 5/2012 | Chandra et al. |
| 8,185,122 B2 | 5/2012 | Guill, Jr. |
| 8,185,137 B2 | 5/2012 | Berns et al. |
| 8,190,699 B2 | 5/2012 | McMillian et al. |
| 8,195,198 B1 | 6/2012 | Shaw et al. |
| 8,195,478 B2 | 6/2012 | Petersen et al. |
| 8,199,654 B2 | 6/2012 | Francisco et al. |
| 8,200,243 B1 | 6/2012 | Feher |
| 8,204,966 B1 | 6/2012 | Mendis et al. |
| 8,205,037 B2 | 6/2012 | Swing et al. |
| 8,205,066 B2 | 6/2012 | Brewer et al. |
| 8,208,489 B2 | 6/2012 | Hong et al. |
| 8,208,940 B2 | 6/2012 | Noldus et al. |
| 8,209,400 B2 | 6/2012 | Baum et al. |
| 8,219,312 B2 | 7/2012 | Davidson et al. |
| 8,223,012 B1 | 7/2012 | Diem |
| 8,223,694 B2 | 7/2012 | Jayapalan et al. |
| 8,223,752 B2 | 7/2012 | Low et al. |
| 8,224,349 B2 | 7/2012 | Meredith et al. |
| 8,225,081 B2 | 7/2012 | Aldereguia et al. |
| 8,230,516 B2 | 7/2012 | Davison et al. |
| 8,233,471 B2 | 7/2012 | Brownrigg et al. |
| 8,234,262 B2 | 7/2012 | Jung et al. |
| 8,234,523 B2 | 7/2012 | Bharadwaj et al. |
| 8,238,869 B2 | 8/2012 | Brayton |
| 8,243,887 B2 | 8/2012 | Conahan |
| 8,244,228 B1 | 8/2012 | Sutardja |
| 8,248,968 B2 | 8/2012 | Handforth et al. |
| 8,249,256 B2 | 8/2012 | Korus et al. |
| 8,249,616 B2 | 8/2012 | Boejer et al. |
| 8,259,822 B1 | 9/2012 | Feher |
| 8,260,896 B2 | 9/2012 | Trevino et al. |
| 8,264,953 B2 | 9/2012 | Licardie et al. |
| 8,265,655 B2 | 9/2012 | Khushu |
| 8,269,618 B2 | 9/2012 | Murray et al. |
| 8,271,626 B2 | 9/2012 | Childers et al. |
| 8,279,838 B2 | 10/2012 | Chou et al. |
| 8,280,913 B2 | 10/2012 | Bergin |
| 8,284,100 B2 | 10/2012 | Vartanian et al. |
| 8,289,210 B2 | 10/2012 | Thomson et al. |
| 8,290,509 B2 | 10/2012 | Jung et al. |
| 8,290,551 B2 | 10/2012 | Landesman et al. |

(56) References Cited

U.S. PATENT DOCUMENTS

| | | | |
|---|---|---|---|
| 8,294,396 B2 | 10/2012 | Wichowski | |
| 8,295,352 B2 | 10/2012 | Leprovost et al. | |
| 8,295,395 B2 | 10/2012 | Mueck et al. | |
| 8,295,853 B2 | 10/2012 | Heikkila et al. | |
| 8,299,967 B2 | 10/2012 | Xu et al. | |
| 8,300,532 B1 | 10/2012 | Venkatramani et al. | |
| 8,300,575 B2 | 10/2012 | Willars | |
| 8,301,159 B2 | 10/2012 | Hamynen et al. | |
| 8,301,375 B2 | 10/2012 | Chiayee et al. | |
| 8,301,564 B2 | 10/2012 | Mon et al. | |
| 8,306,005 B1 | 11/2012 | Gurin | |
| 8,306,518 B1 | 11/2012 | Gailloux et al. | |
| 8,311,035 B2 | 11/2012 | Bossler et al. | |
| 8,311,509 B2 | 11/2012 | Feher | |
| 8,311,513 B1 | 11/2012 | Nasserbakht et al. | |
| 8,311,532 B2 | 11/2012 | Waller | |
| 8,311,579 B2 | 11/2012 | Rofougaran et al. | |
| 8,315,203 B2 | 11/2012 | Ashley, Jr. et al. | |
| 8,315,622 B2 | 11/2012 | Rofougaran | |
| 8,316,394 B2 | 11/2012 | Yates | |
| 8,316,435 B1 | 11/2012 | Varadhan et al. | |
| 8,320,261 B2 | 11/2012 | Vasamsetti et al. | |
| 8,321,727 B2 | 11/2012 | D'Abreu et al. | |
| 8,325,901 B1 | 12/2012 | Dolan et al. | |
| 8,327,117 B2 | 12/2012 | Smilg et al. | |
| 8,327,431 B2 | 12/2012 | Trojanowski | |
| 8,331,935 B2 | 12/2012 | Tamura et al. | |
| 8,340,476 B2 | 12/2012 | Cohen et al. | |
| 8,340,578 B2 | 12/2012 | Tolentino et al. | |
| 8,341,469 B2 | 12/2012 | Miyama et al. | |
| 8,346,282 B1 | 1/2013 | Dronamraju et al. | |
| 8,346,879 B2 | 1/2013 | Meunier et al. | |
| 8,352,872 B2 | 1/2013 | Fish | |
| 8,358,975 B2 | 1/2013 | Bahl et al. | |
| 8,369,871 B1 | 2/2013 | Izdepski et al. | |
| 8,378,815 B1 | 2/2013 | McNulty et al. | |
| 8,380,188 B2 | 2/2013 | Ramachandra Rao et al. | |
| 8,391,930 B1 | 3/2013 | Delker et al. | |
| 8,406,753 B2 | 3/2013 | Alles et al. | |
| 8,412,590 B2 | 4/2013 | Elliott | |
| 8,412,946 B2 | 4/2013 | Savitzky et al. | |
| 8,417,215 B2 | 4/2013 | Baldus et al. | |
| 8,423,046 B2 | 4/2013 | Phillips | |
| 8,442,482 B2 | 5/2013 | Maier et al. | |
| 8,447,352 B2 | 5/2013 | Forte | |
| 8,477,645 B2 | 7/2013 | Scherzer et al. | |
| 8,689,021 B1 | 4/2014 | Bai et al. | |
| 8,729,977 B2 | 5/2014 | Filipovic et al. | |
| 8,755,821 B2 | 6/2014 | Brisebois et al. | |
| 8,810,452 B2 | 8/2014 | Bull | |
| 8,825,016 B1 | 9/2014 | Lambert et al. | |
| 9,037,162 B2 | 5/2015 | Morgan et al. | |
| 9,143,530 B2 | 9/2015 | Qureshi et al. | |
| 2002/0081992 A1 | 6/2002 | Keller et al. | |
| 2002/0147002 A1* | 10/2002 | Trop | H04M 15/00 455/406 |
| 2003/0013449 A1 | 1/2003 | Hose et al. | |
| 2003/0021263 A1 | 1/2003 | Lee | |
| 2003/0032404 A1 | 2/2003 | Wager et al. | |
| 2003/0061503 A1* | 3/2003 | Katz | H04L 29/06 726/4 |
| 2003/0076904 A1 | 4/2003 | Magee | |
| 2003/0083988 A1 | 5/2003 | Reith | |
| 2003/0096591 A1* | 5/2003 | Pohutsky et al. | 455/406 |
| 2003/0118015 A1 | 6/2003 | Gunnarsson et al. | |
| 2003/0128115 A1 | 7/2003 | Giacopelli et al. | |
| 2003/0143986 A1 | 7/2003 | Mufti et al. | |
| 2003/0220107 A1 | 11/2003 | Lioy et al. | |
| 2004/0006477 A1 | 1/2004 | Craner | |
| 2004/0023669 A1 | 2/2004 | Reddy | |
| 2004/0063451 A1 | 4/2004 | Bonta et al. | |
| 2004/0123159 A1 | 6/2004 | Kerstens et al. | |
| 2004/0132427 A1 | 7/2004 | Lee et al. | |
| 2004/0174927 A1 | 9/2004 | Cooper | |
| 2004/0176024 A1 | 9/2004 | Hsu et al. | |
| 2004/0192342 A1 | 9/2004 | Ranganathan | |
| 2004/0203718 A1 | 10/2004 | Knauerhase et al. | |
| 2004/0222834 A1 | 11/2004 | Frans et al. | |
| 2005/0048965 A1 | 3/2005 | Ebata | |
| 2005/0059400 A1 | 3/2005 | Jagadeesan et al. | |
| 2005/0181728 A1 | 8/2005 | Hansen et al. | |
| 2005/0190902 A1 | 9/2005 | Benco et al. | |
| 2005/0195759 A1 | 9/2005 | Hosein et al. | |
| 2006/0004942 A1 | 1/2006 | Hetherington et al. | |
| 2006/0035605 A1 | 2/2006 | Ozluturk et al. | |
| 2006/0069916 A1 | 3/2006 | Jenisch et al. | |
| 2006/0072527 A1* | 4/2006 | Beck et al. | 370/338 |
| 2006/0094414 A1 | 5/2006 | Miyake et al. | |
| 2006/0098625 A1 | 5/2006 | King et al. | |
| 2006/0111112 A1 | 5/2006 | Maveddat | |
| 2006/0116127 A1 | 6/2006 | Wilhoite et al. | |
| 2006/0171364 A1 | 8/2006 | Bosch et al. | |
| 2006/0171523 A1* | 8/2006 | Greenwell | 379/242 |
| 2006/0205400 A1 | 9/2006 | Kiyomoto | |
| 2007/0008928 A1 | 1/2007 | Kezys | |
| 2007/0032225 A1 | 2/2007 | Konicek et al. | |
| 2007/0054674 A1 | 3/2007 | Cohen et al. | |
| 2007/0082677 A1 | 4/2007 | Donald Hart et al. | |
| 2007/0111714 A1* | 5/2007 | Edwards | 455/415 |
| 2007/0116016 A1 | 5/2007 | Cohen et al. | |
| 2007/0157041 A1 | 7/2007 | Youngs | |
| 2007/0179885 A1 | 8/2007 | Bird et al. | |
| 2007/0220589 A1 | 9/2007 | Salowey et al. | |
| 2007/0237101 A1 | 10/2007 | Cohen et al. | |
| 2007/0267491 A1 | 11/2007 | Muto et al. | |
| 2008/0002610 A1 | 1/2008 | Zheng et al. | |
| 2008/0022354 A1 | 1/2008 | Grewal et al. | |
| 2008/0026704 A1 | 1/2008 | Maeda et al. | |
| 2008/0031307 A1 | 2/2008 | Fukuoka et al. | |
| 2008/0039132 A1 | 2/2008 | Delibie et al. | |
| 2008/0107051 A1* | 5/2008 | Chen | H04W 48/18 370/310 |
| 2008/0112354 A1 | 5/2008 | Toutonghi | |
| 2008/0113692 A1 | 5/2008 | Zhao et al. | |
| 2008/0137545 A1 | 6/2008 | Shiue et al. | |
| 2008/0167045 A1 | 7/2008 | Lee et al. | |
| 2008/0214155 A1 | 9/2008 | Ramer et al. | |
| 2008/0258981 A1 | 10/2008 | Achour et al. | |
| 2008/0267069 A1 | 10/2008 | Thielman et al. | |
| 2008/0280590 A1 | 11/2008 | Ward | |
| 2008/0310340 A1 | 12/2008 | Isozu | |
| 2009/0043626 A1 | 2/2009 | Choi et al. | |
| 2009/0068984 A1* | 3/2009 | Burnett | H04M 1/663 455/408 |
| 2009/0110113 A1 | 4/2009 | Wu et al. | |
| 2009/0138599 A1 | 5/2009 | Allin | |
| 2009/0149182 A1 | 6/2009 | Tamura et al. | |
| 2009/0222539 A1 | 9/2009 | Lewis et al. | |
| 2009/0227229 A1 | 9/2009 | Waller | |
| 2009/0252263 A1 | 10/2009 | Liu et al. | |
| 2009/0268640 A1* | 10/2009 | Tsai | H04M 3/42246 370/262 |
| 2009/0276570 A1 | 11/2009 | Cheng et al. | |
| 2009/0296237 A1 | 12/2009 | Bowers et al. | |
| 2009/0316612 A1 | 12/2009 | Poilasne et al. | |
| 2009/0325601 A1 | 12/2009 | Park et al. | |
| 2010/0030831 A1 | 2/2010 | Standfield | |
| 2010/0046358 A1 | 2/2010 | van Nee | |
| 2010/0071038 A1 | 3/2010 | Flynn et al. | |
| 2010/0093342 A1 | 4/2010 | Ramachandra Rao et al. | |
| 2010/0201516 A1 | 8/2010 | Gelvin et al. | |
| 2010/0203863 A1 | 8/2010 | Kapelushnik et al. | |
| 2010/0216491 A1 | 8/2010 | Winkler et al. | |
| 2010/0273487 A1 | 10/2010 | Alonso-Rubio et al. | |
| 2010/0291863 A1 | 11/2010 | Hsu et al. | |
| 2010/0303182 A1 | 12/2010 | Daneshrad et al. | |
| 2010/0305931 A1 | 12/2010 | Fordham | |
| 2011/0029236 A1 | 2/2011 | Zhou | |
| 2011/0034176 A1 | 2/2011 | Lord et al. | |
| 2011/0034179 A1 | 2/2011 | David et al. | |
| 2011/0081890 A1 | 4/2011 | Ahmadvand et al. | |
| 2011/0082621 A1 | 4/2011 | Berkobin et al. | |
| 2011/0136507 A1 | 6/2011 | Hauser et al. | |
| 2011/0171977 A1 | 7/2011 | Putkiranta | |

(56) References Cited

U.S. PATENT DOCUMENTS

| | | |
|---|---|---|
| 2011/0173312 A1 | 7/2011 | Robin |
| 2011/0191205 A1 | 8/2011 | Enmei |
| 2011/0201318 A1 | 8/2011 | Kobylarz |
| 2011/0202879 A1 | 8/2011 | Stovicek et al. |
| 2011/0227925 A1 | 9/2011 | De Pauw et al. |
| 2011/0251892 A1 | 10/2011 | Laracey |
| 2011/0263220 A1* | 10/2011 | Bot .............................. 455/406 |
| 2011/0275366 A1 | 11/2011 | Russell et al. |
| 2011/0298669 A1 | 12/2011 | Rao et al. |
| 2011/0321130 A1 | 12/2011 | Tor et al. |
| 2011/0321152 A1 | 12/2011 | Tor et al. |
| 2012/0005323 A1 | 1/2012 | Li et al. |
| 2012/0008570 A1 | 1/2012 | Li et al. |
| 2012/0019892 A1 | 1/2012 | Bowers et al. |
| 2012/0054468 A1 | 3/2012 | Egger et al. |
| 2012/0056720 A1 | 3/2012 | Barvick et al. |
| 2012/0069131 A1 | 3/2012 | Abelow |
| 2012/0072990 A1 | 3/2012 | Gutt et al. |
| 2012/0083291 A1 | 4/2012 | Thomson et al. |
| 2012/0092158 A1 | 4/2012 | Kumbhar et al. |
| 2012/0148043 A1 | 6/2012 | Tofighbakhsh |
| 2012/0159090 A1 | 6/2012 | Andrews et al. |
| 2012/0202454 A1 | 8/2012 | Smith et al. |
| 2012/0230305 A1 | 9/2012 | Barbu et al. |
| 2012/0240197 A1 | 9/2012 | Tran et al. |
| 2012/0249284 A1 | 10/2012 | Almquist et al. |
| 2012/0256702 A1 | 10/2012 | Khlat et al. |
| 2012/0257527 A1 | 10/2012 | Jorgensen |
| 2012/0281526 A1 | 11/2012 | Singamsetty et al. |
| 2012/0281558 A1 | 11/2012 | Anderson et al. |
| 2012/0282890 A1 | 11/2012 | Gaikwad et al. |
| 2012/0297202 A1 | 11/2012 | Gallet et al. |
| 2012/0329447 A1 | 12/2012 | Gilbert et al. |
| 2012/0331537 A1 | 12/2012 | Flynn et al. |
| 2013/0007245 A1 | 1/2013 | Malik et al. |
| 2013/0007488 A1 | 1/2013 | Jo |
| 2013/0022030 A1 | 1/2013 | Hillier |
| 2013/0023235 A1 | 1/2013 | Fan et al. |
| 2013/0031631 A1 | 1/2013 | Waltermann et al. |
| 2013/0060689 A1 | 3/2013 | Oskolkov et al. |
| 2013/0093460 A1 | 4/2013 | Voogel et al. |
| 2013/0103939 A1 | 4/2013 | Radpour |
| 2013/0106682 A1 | 5/2013 | Davis et al. |
| 2013/0106892 A1 | 5/2013 | Davis et al. |
| 2013/0107748 A1 | 5/2013 | Dravida et al. |
| 2013/0133023 A1 | 5/2013 | Burstein et al. |
| 2013/0140649 A1 | 6/2013 | Rogers et al. |
| 2013/0157688 A1 | 6/2013 | Kateley et al. |
| 2013/0165111 A1 | 6/2013 | Willins |
| 2013/0179681 A1 | 7/2013 | Benson et al. |
| 2013/0339771 A1 | 12/2013 | Ryu |
| 2014/0018110 A1 | 1/2014 | Yoakum |
| 2014/0066074 A1 | 3/2014 | Folke et al. |
| 2014/0068717 A1 | 3/2014 | Mayes et al. |
| 2014/0073289 A1 | 3/2014 | Velasco |
| 2014/0122689 A1 | 5/2014 | Park et al. |
| 2014/0143629 A1 | 5/2014 | Hassan et al. |
| 2014/0173733 A1 | 6/2014 | Ford |
| 2015/0065134 A1 | 3/2015 | Vandemoere et al. |
| 2015/0237596 A1 | 8/2015 | Carlsson et al. |
| 2015/0271759 A1 | 9/2015 | Abraham et al. |
| 2016/0095001 A1 | 3/2016 | Uelk et al. |
| 2016/0253731 A1 | 9/2016 | Ketchel, III et al. |

FOREIGN PATENT DOCUMENTS

| | | |
|---|---|---|
| JP | 2004340864 | 2/2004 |
| WO | WO 2012/150880 A1 | 11/2012 |

OTHER PUBLICATIONS

PCT International Search Report; International App. No. PCT/US13/78343; Apr. 17, 2014; pp. 1-3.

PCT International Search Report; International App. No. PCT/US13/78349; Apr. 17, 2014; pp. 1-2.

U.S. Appl. No. 13/731,907, Barnes et al.

"20 Myths of Wi-Fi Interference"; Cisco Spectrum Expert, Cisco Systems; printed on Dec. 3, 2012; pp. 1-6; located at: http://www.cisco.com/en/US/prod/collateral/wireless/ps9391/ps939/ps9394/prod_white_paper0900aecd807395a9.html.

"Android rooting"; Wikipedia, the free encyclopedia; bearing a date of Jun. 10, 2013; printed on Jun. 13, 2013; pp. 1-6; located at: http://en.wikipedia.org/wiki/Android_rooting.

"Computer architecture"; Wikipedia, the free encyclopedia; bearing a date of Jun. 12, 2013; printed on Jun. 13, 2013; pp. 1-7; located at: http://en.wikipedia.org/wiki/Computer_architecture.

"Google Talk"; Wikipedia, the free encyclopedia; bearing a date of Nov. 10, 2012, printed on Nov. 26, 2012; pp. 1-10; located at: http://en.wikipedia.org/wiki/Google_talk.

"Google Voice"; Wikipedia, the free encyclopedia; bearing a date of Nov. 11, 2012, printed on Nov. 26, 2012; pp. 1-13; located at: http://en.wikipedia.org/wiki/Google_voice.

"High-level programming language"; Wikipedia, the free encyclopedia; bearing a date of Jun. 13, 2013; printed on Jun. 13, 2013; pp. 1-4; located at: http://en.wikipedia.org/wiki/High-level_programming_language.

Hussain, Faisal; "How to ROOT Samsung Galaxy S3 for AT&T, Sprint, and T-Mobile"; WonderHowTo; printed on Jun. 13, 2013; pp. 1-3; located at http://gs3.wonderhowto.com/how-to/root-samsung-galaxy-s3-for-at-t-spring-and-t-mobile-0142229/.

"Instructions per second"; Wikipedia, the free encyclopedia; bearing a date of Jun. 2, 2013; printed on Jun. 13, 2013; pp. 1-8; located at: http://en.wikipedia.org/wiki/Instructions_per_second.

"iOS jailbreaking"; Wikipedia, the free encyclopedia; bearing a date of Jun. 8, 2013; printed on Jun. 13, 2013; pp. 1-13; located at http://en.wikipedia.org/wiki/IOS_jailbreaking.

Khalid, Hamza; "How to Jailbreak (Unlock) Samsung Focus [Guide]"; AddictiveTips; Jul. 21, 2011; printed on Jun. 13, 2013; pp. 1-4; located at: http://www.addictivetips.com/mobile/how-to-jailbreak-unlock-samsung-focus-guide/.

"Logic gate"; Wikipedia, the free encyclopedia; bearing a date of Jun. 9, 2013; printed on Jun. 13, 2013; pp. 1-9; located at: http://en.wikipedia.org/wiki/Logic_gate.

"Make a computer to computer voice or video chat"; Google Chat Help; bearing a date of 2012, printed on Nov. 26, 2012; pp. 1-2; located at: http://support.google.com/chat/bin/answer.py?hl=en&answer=161986.

"Meraki WiFi Stumbler"; Cisco Systems, Inc.; printed on Feb. 7, 2013; pp. 1-5; located at: http://www.meraki.com/products/wireless/wifi-stumbler#faq:what_is_wifi_stumbler.

"Metamaterial antenna"; Wikipedia, the free encyclopedia; bearing a date of Jan. 6, 2013, printed on Feb. 7, 2013; pp. 1-24; located at: http://en.wikipedia.org/wiki/Metamaterial_antenna.

"Natural language"; Wikipedia, the free encyclopedia; bearing a date of May 9, 2013; printed on Jun. 13, 2013; pp. 1-5; located at: http://en.wikipedia.org/wiki/Natural_language.

Page, Sebastien; "The Difference Between Jailbreaking and Unlocking"; iDownloadBlog; Jul. 10, 2009; printed on Jun. 13, 2013; pp. 1-5; located at: http://www.idownloadblog.com/2009/07/10/difference-jailbreaking-unlocking/.

"PlayStation Jailbreak"; Wikipedia, the free encyclopedia; bearing a date of May 11, 2013; printed on Jun. 13, 2013; located at: http://en.wikipedia.org/wiki/PlayStation_Jailbreak.

"Rooting vs Jailbreak"; AndroidCentral.com; Feb. 25, 2012; printed on Jun. 13, 2013; pp. 1-6; located at: http://forums.androidcentral.com/t-mobile-galaxy-s-ii/158273-rooting-vs-jailbreak.html.

"Tunable metamaterials"; Wikipedia, the free encyclopedia; bearing a date of Jan. 28, 2013, printed on Feb. 7, 2013; pp. 1-13; located at: http://en.wikipedia.org/wiki/Tunable_metamaterials.

"Wireless LAN"; Wikipedia, the free encyclopedia; bearing a date of Dec. 2, 2012, printed on Dec. 3, 2012; pp. 1-7; located at: http://en.wikipedia.org/wiki/Wireless_lan.

Howard Forums Mobile Community, Thread: 3026; Dec. 21, 2011; accessed May 14, 2014; located at: www.howardforums.com/showthread.php/1747000-3026.

(56) References Cited

OTHER PUBLICATIONS

"Comcast to Boost Neighborhood Wi-Fi"; Zacks Equity Research, Analyst Blog; bearing a date of Jun. 11, 2013; printed on Jun. 19, 2013; pp. 1-3; located at: http://www.zacks.com/stock/news/101334/comcast-to-boost-neighborhood-wi-fi.

"Comcast Unveils Plans for Millions of Xfinity WiFi Hotspots"; Comcast; bearing a date of Jun. 10, 2013; printed on Jun. 19, 2013; pp. 1-2; Washington, D.C. and Philadelphia, PA; located at: http://corporate.comcast.com/news-information/news-feed/comcast-unveils-plans-for-millions-of-xfinity-wifi-hotspots-through-its-home-based-neighborhood-hotspot-initiative-2.

"How it works"; Fon Ltd.; printed on Jun. 19, 2013; pp. 1-4; located at: http://corp.fon.com/how-it-works.

"The all-new AirPort Time Capsule"; Apple-Mac; printed on Jun. 19, 2013; pp. 1-6; located at: http://www.apple.com/airport-time-capsule/.

Beren, David; "T-Mobile Clarifies International WiFi Calling Charges", located at http://www.tmonews.com/2011/05/t-mobile-clarifies-international-wifi-calling-charges/; TmoNews; bearing a date of May 26, 2011; pp. 1-2; PhoneDog, LLC.

European Patent Office, Extended European Search Report, Pursuant to Rule 62 EPC; App. No. EP 13867549; Nov. 16, 2016 (received by our Agent on Nov. 23, 2016); pp. 1-14.

European Patent Office, Extended European Search Report, Pursuant to Rule 62 EPC; App. No. EP 13866738.1; Apr. 11, 2016(received by our Agent on Apr. 20, 2016); pp. 1-8.

European Patent Office, Supplementary European Search Report, Pursuant to Rule 62 EPC; App. No. EP 13867549; May 11, 2016 (received by our Agent on Jun. 6, 2016); 1 page.

\* cited by examiner

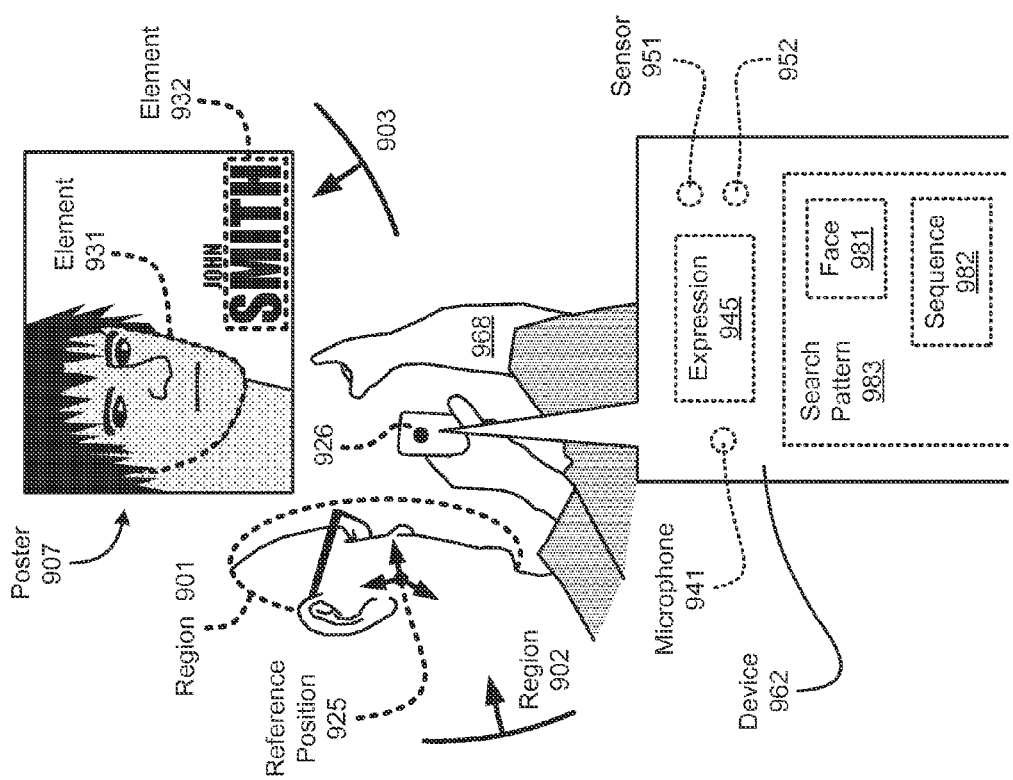

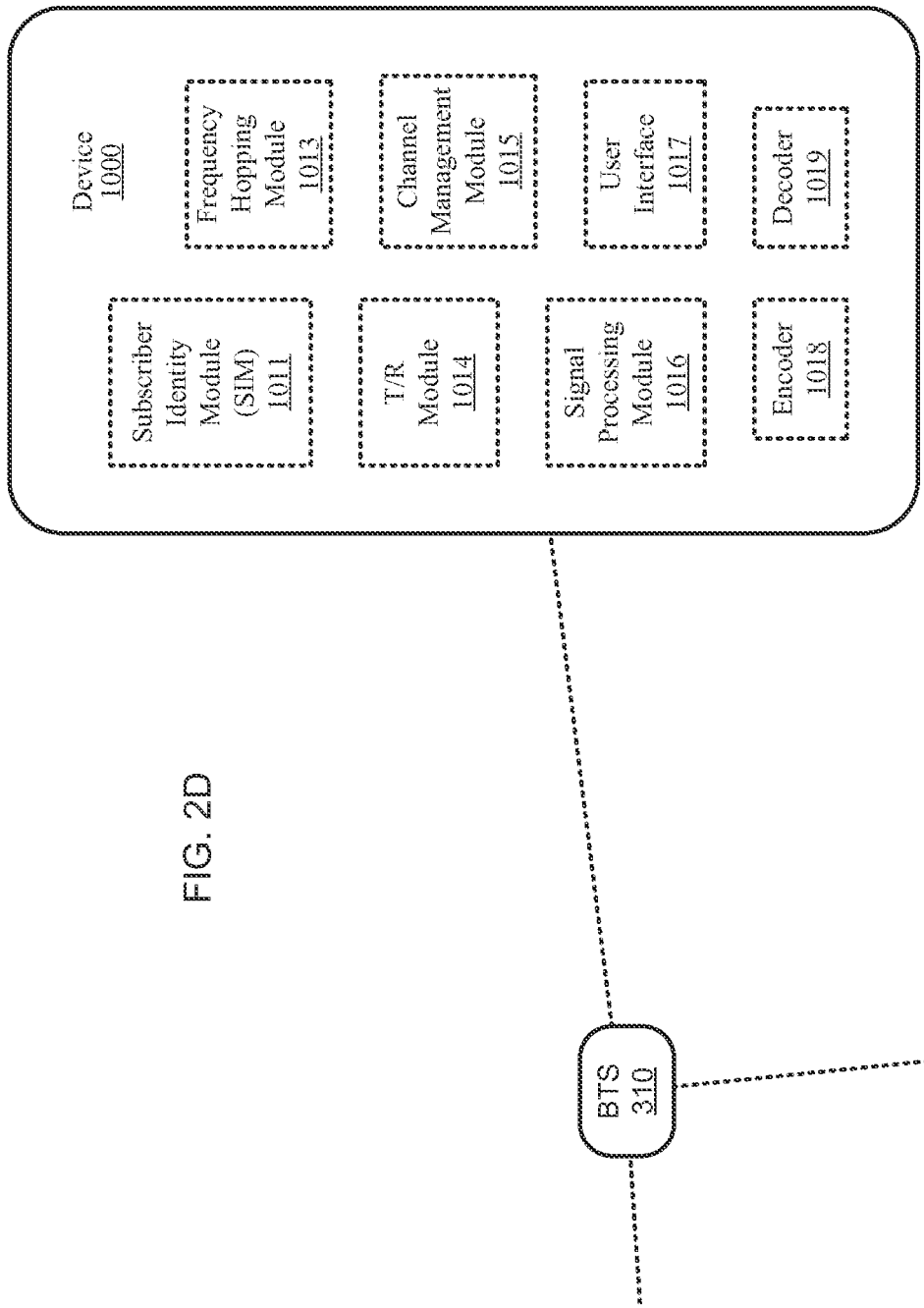

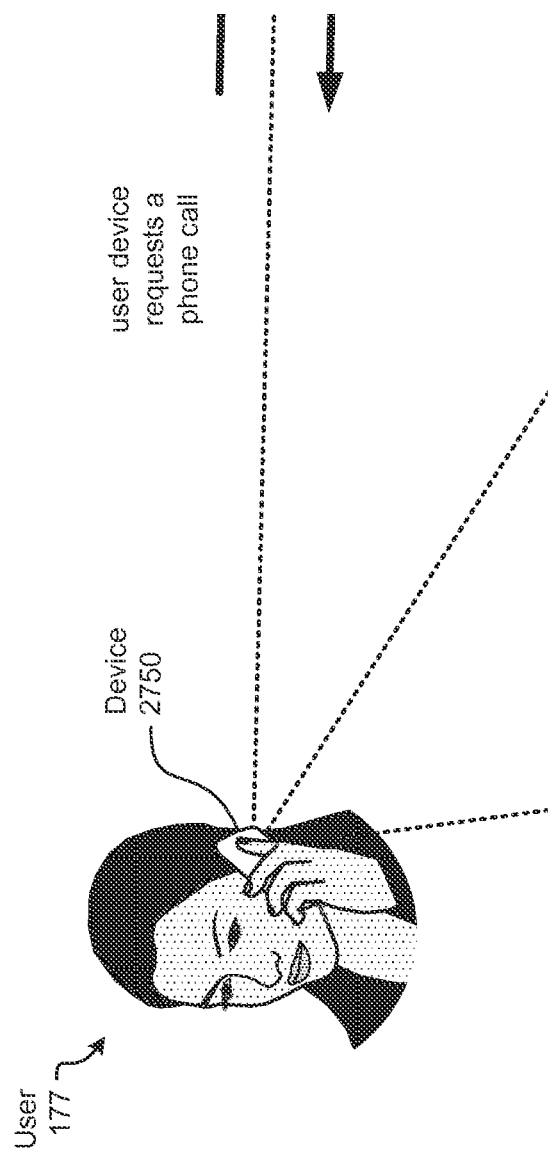

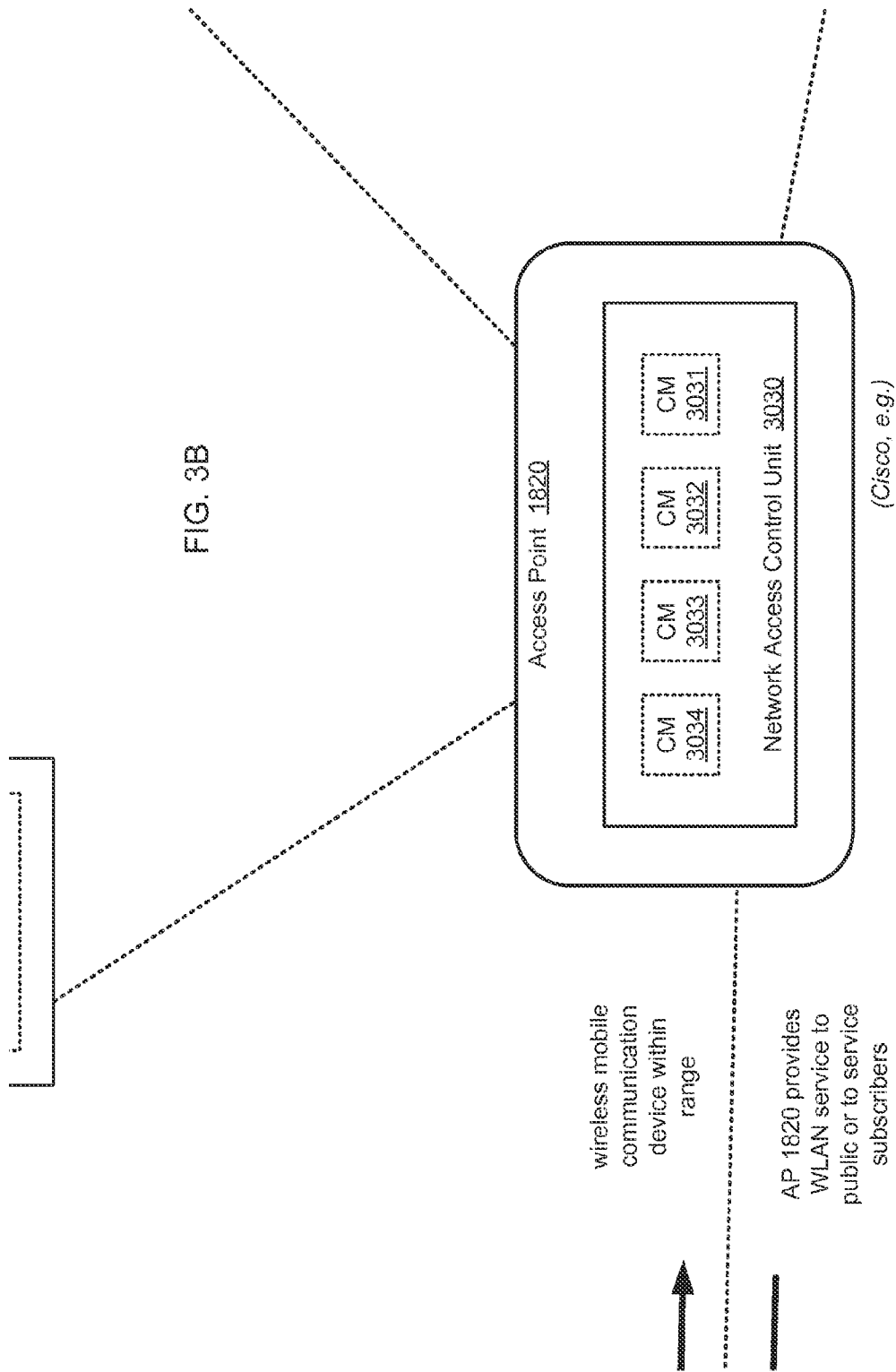

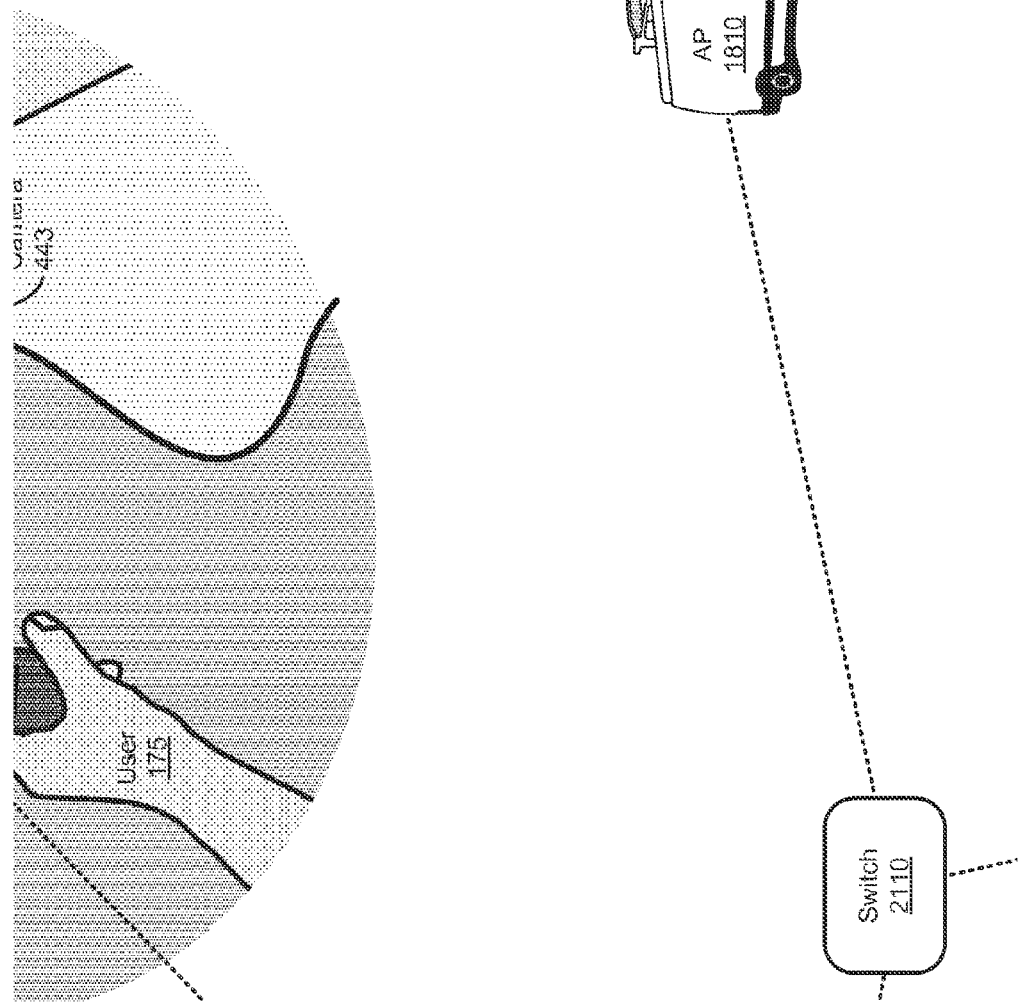

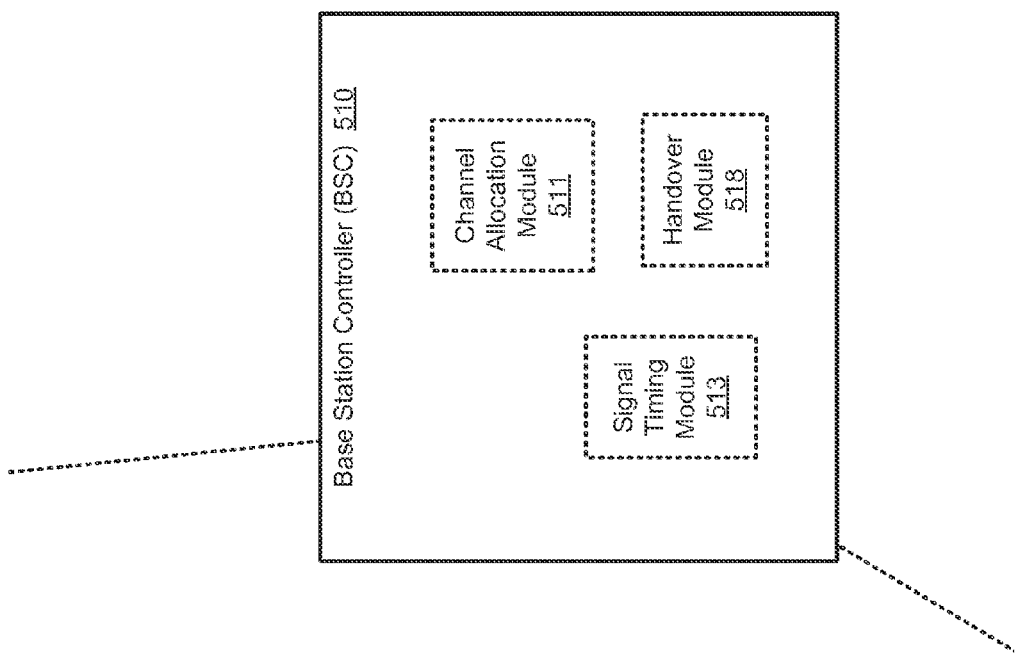

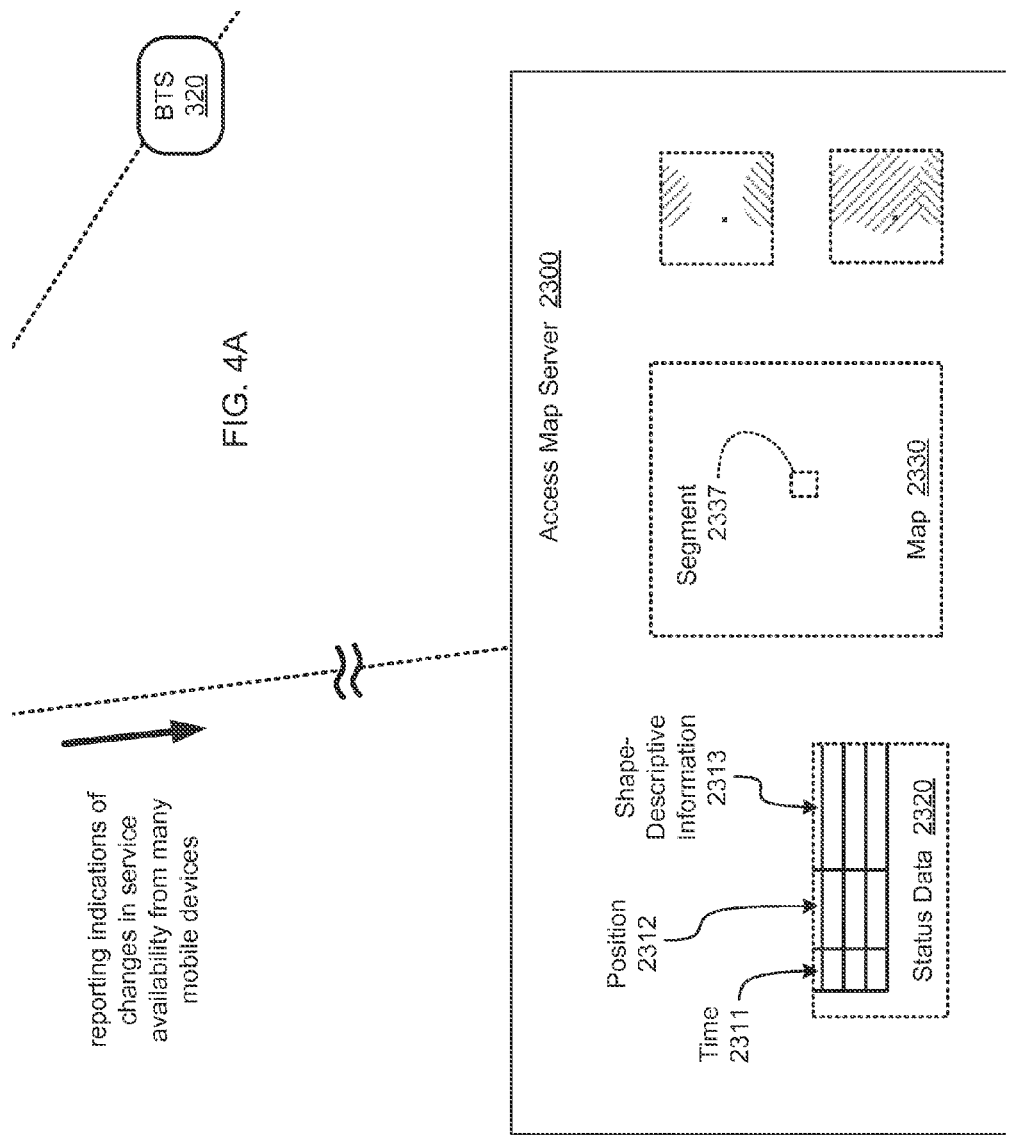

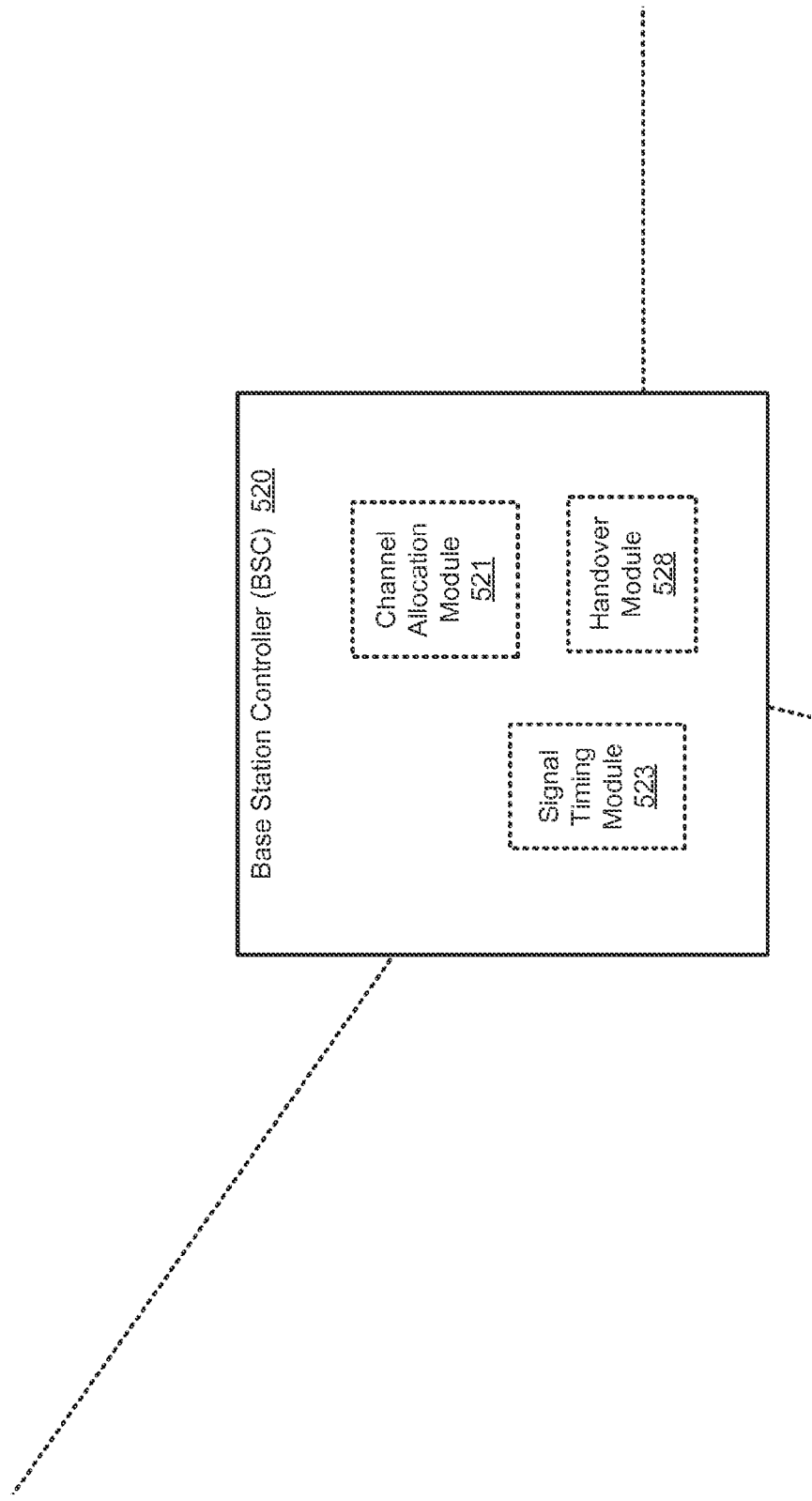

FIG. 4D

Subscriber Status Database 680

| Cust_ID | Allocation | Balance | Days |
|---|---|---|---|
| 184599-2837 | 1000 | 108 | 16 |
| 259300-6102 | 800 | 0 | 22 |
| 275032-7264 | 800 | 76 | 9 |
| 389230-9015 | 1000 | 0 | 27 |
| 429053-4101 | 800 | 13 | 23 |
| 471953-9333 | 1000 | 179 | 28 |
| 501605-2719 | 1000 | 116 | 4 |
| 507779-7257 | 500 | 134 | 5 |
| 533568-1895 | 800 | 4 | 3 |
| 595000-3836 | 800 | 23 | 10 |
| 625762-7524 | 1000 | 252 | 14 |
| 765514-9662 | 1000 | 0 | 2 |
| 872127-5012 | 1200 | 723 | 22 |
| 876238-2744 | 800 | 225 | 12 |
| 958606-4003 | 1000 | 0 | 10 |
| 986136-2908 | 1000 | 148 | 5 |
| 991004-2569 | 1000 | 94 | 5 |

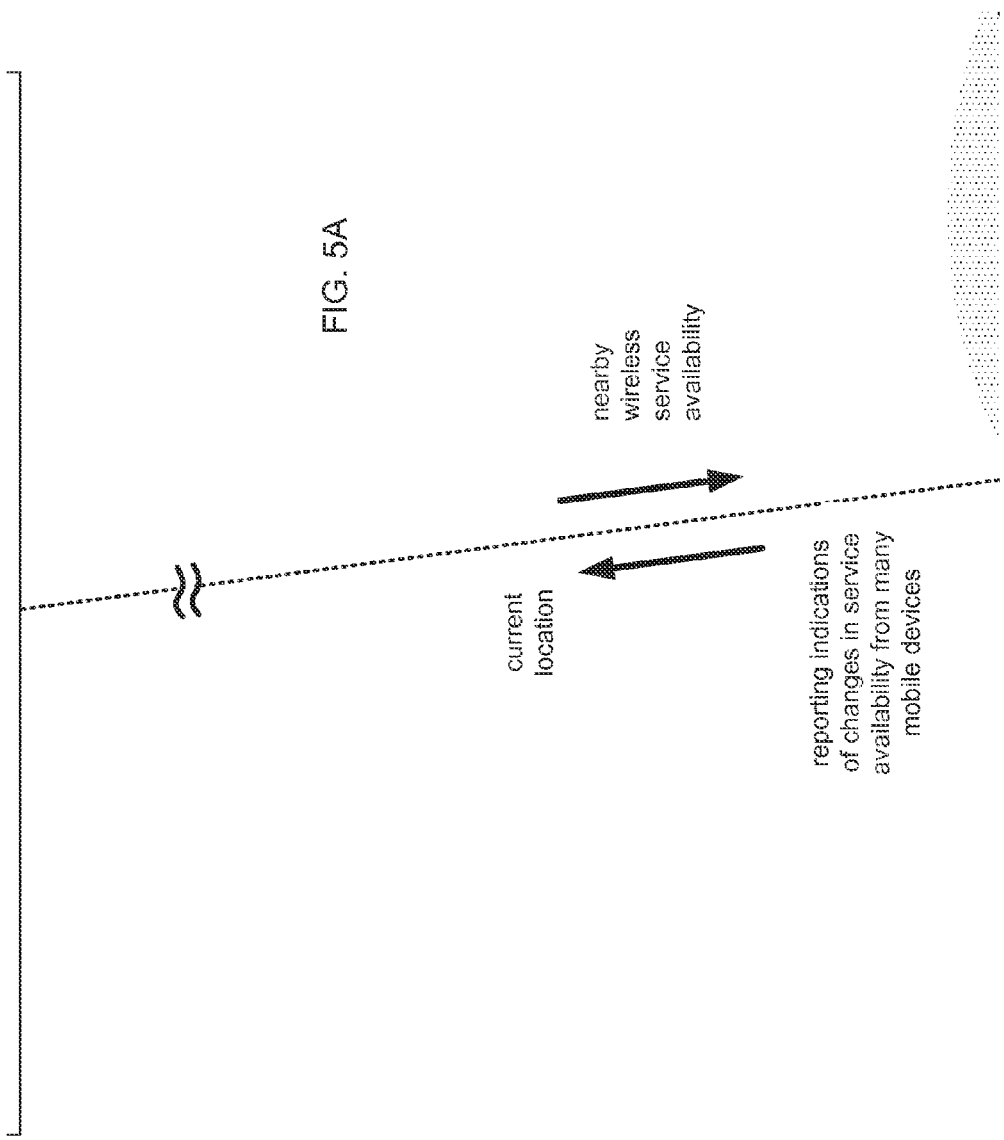

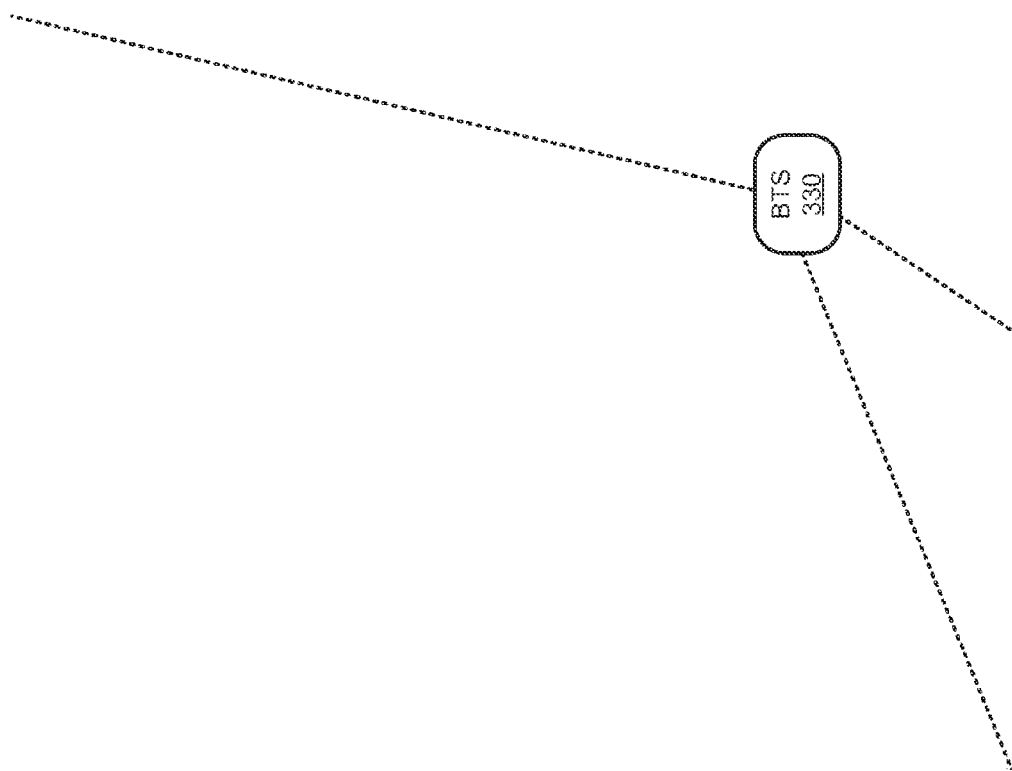

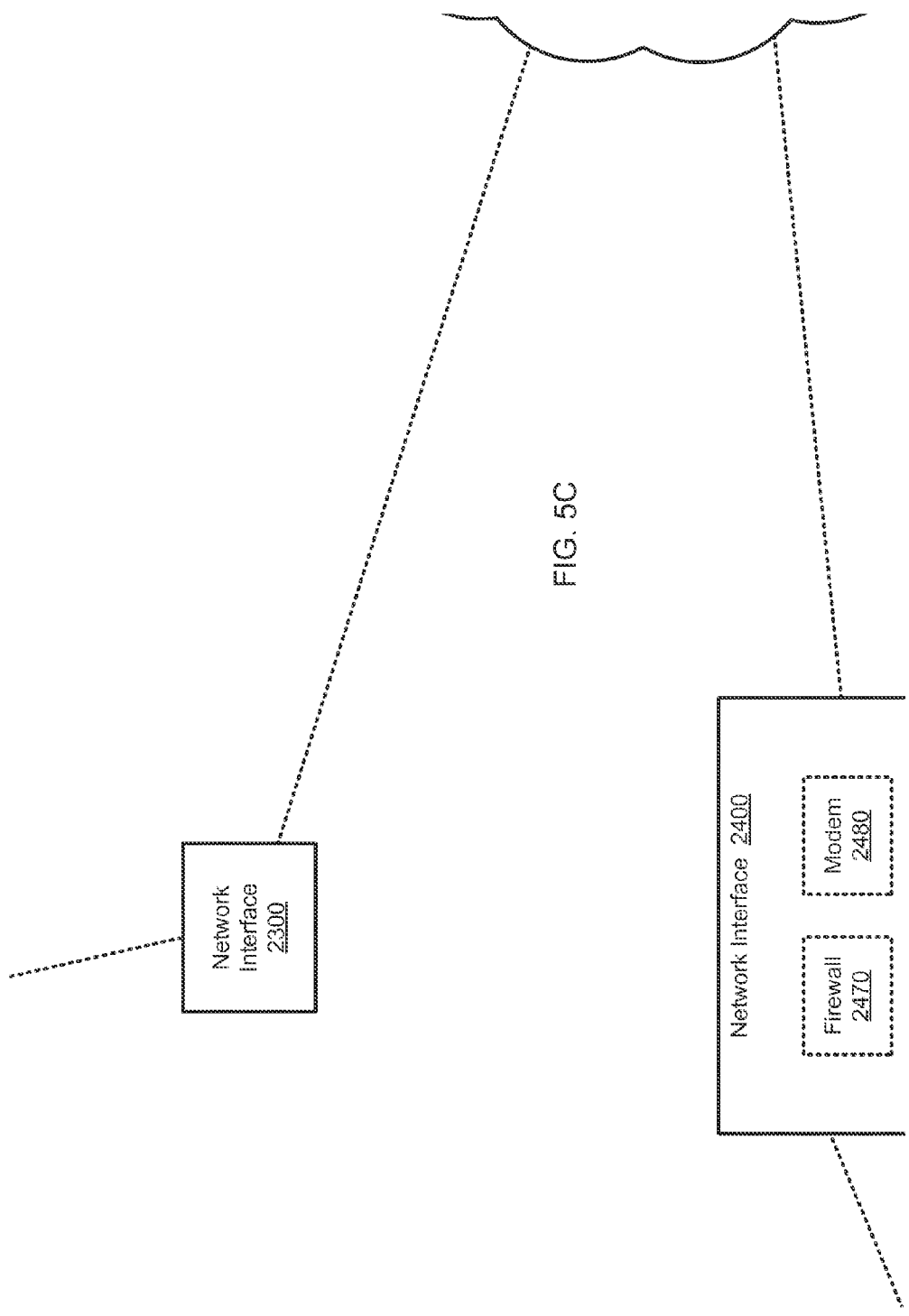

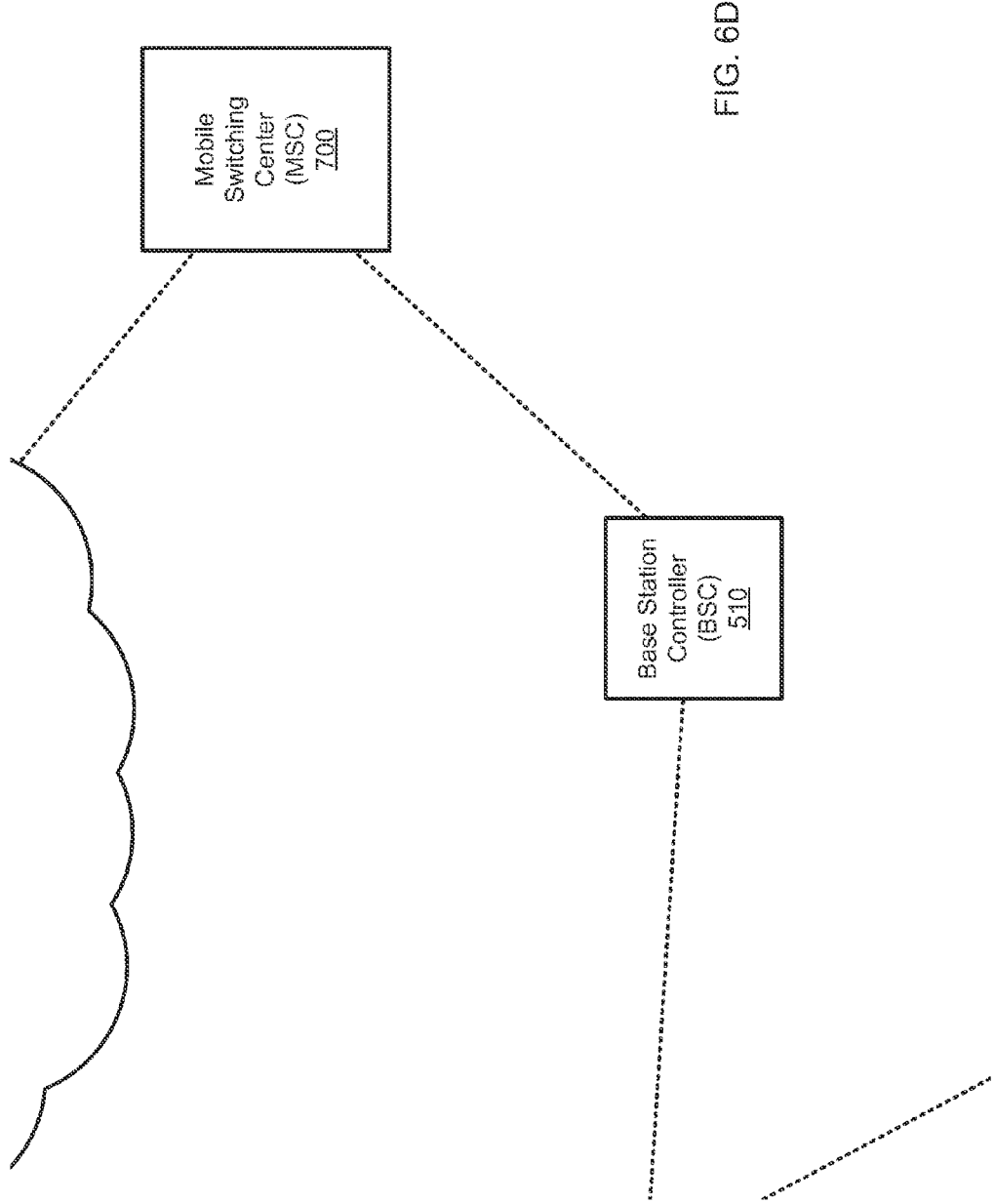

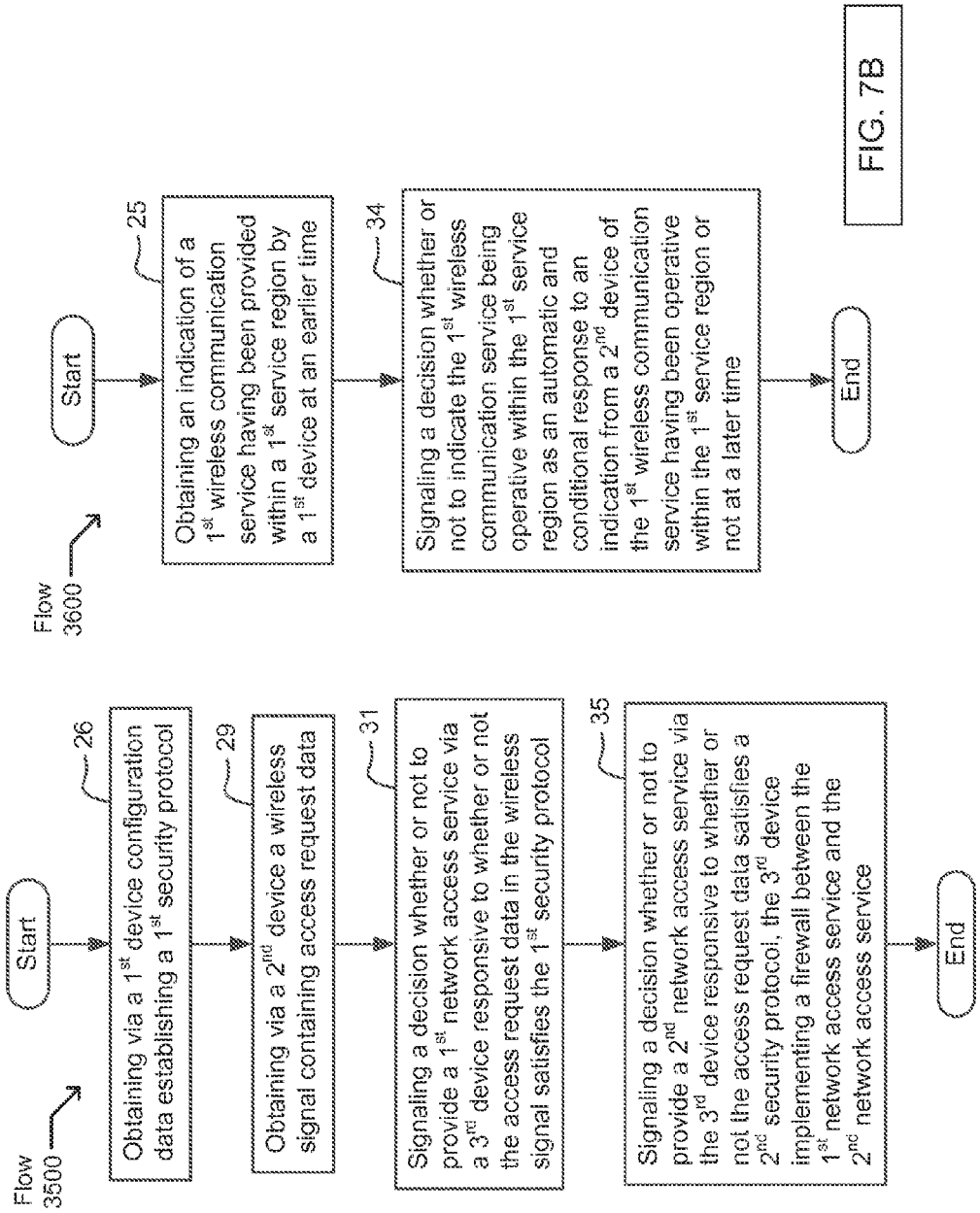

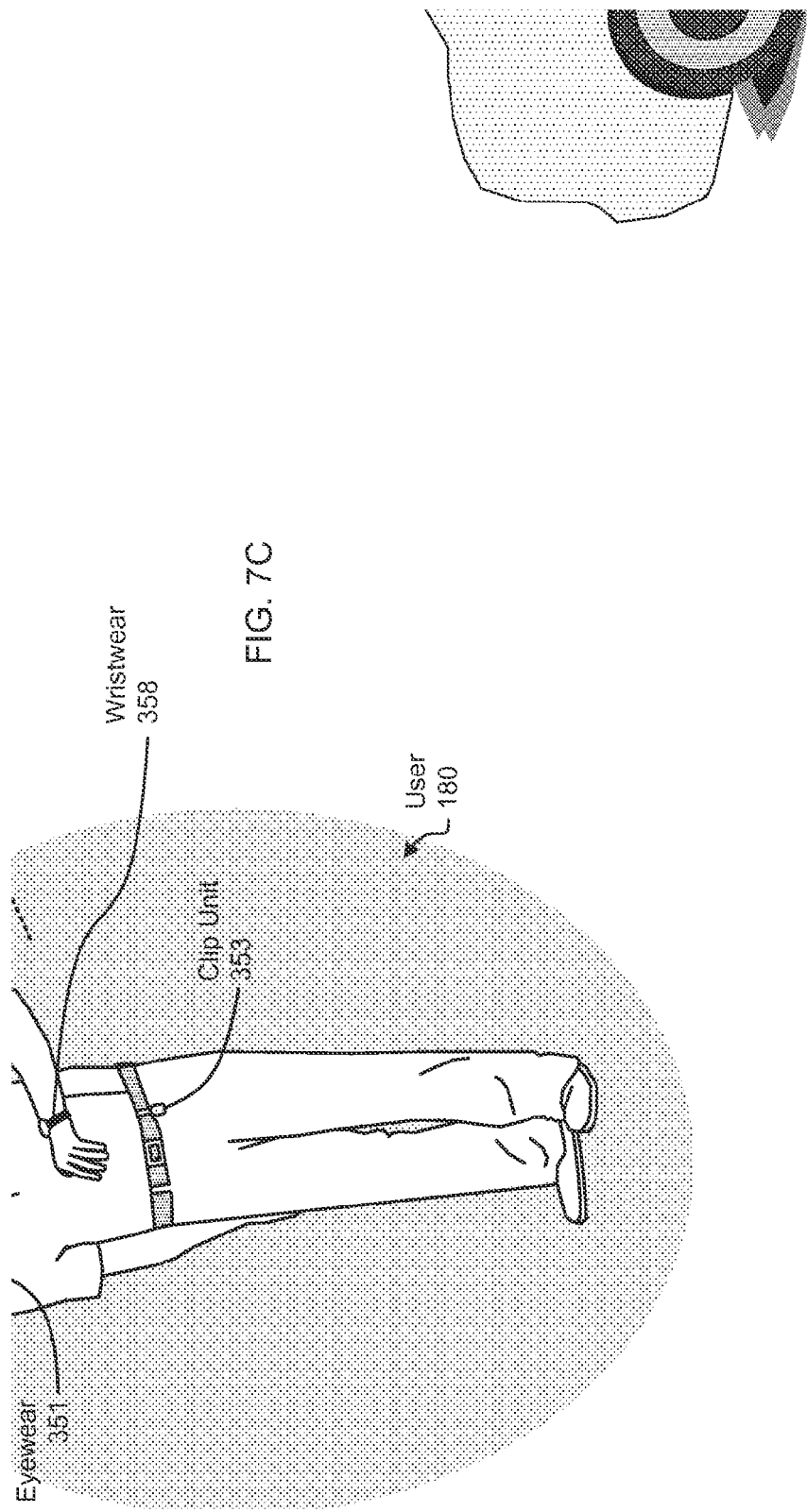

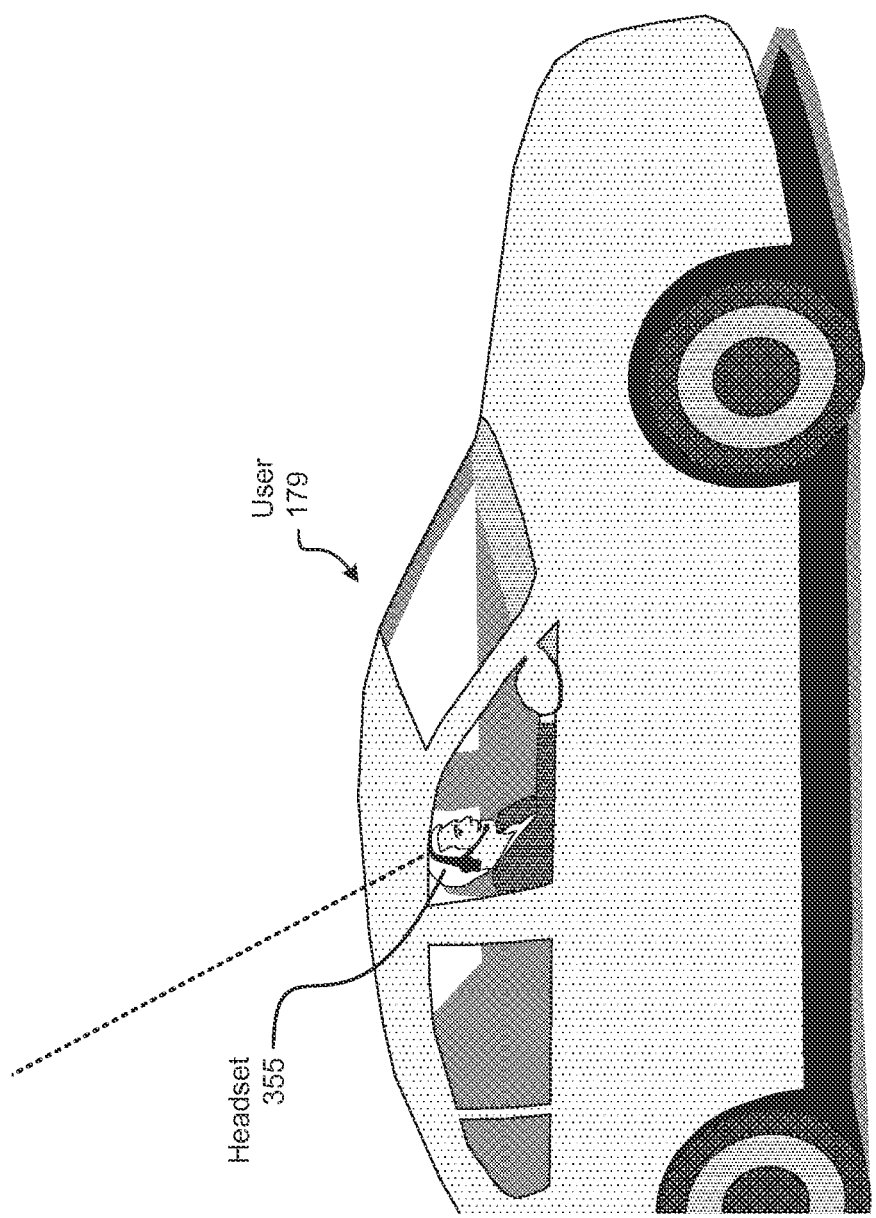

PROTOCOLS FOR FACILITATING BROADER ACCESS IN WIRELESS COMMUNICATIONS

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application is related to and/or claims the benefit of the earliest available effective filing date(s) from the following listed application(s) (the "Priority applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority application(s)). In addition, the present application is related to the "Related applications," if any, listed below.

PRIORITY APPLICATIONS

Not applicable.

RELATED APPLICATIONS

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, *Benefit of Prior-Filed Application*, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority applications section of this application.

All subject matter of the Priority applications and the Related applications and of any and all parent, grandparent, great-grandparent, etc. applications of the Priority applications and the Related applications, including any priority claims, is incorporated herein by reference to the extent such subject matter is not inconsistent herewith.

TECHNICAL FIELD

This disclosure relates to facilitating connectivity in wireless communications.

BRIEF DESCRIPTION OF THE FIGURES

FIG. 2 comprises a 24-sheet depiction of an environment in which one or more technologies may be implemented in which sub-parts are labeled as FIGS. 2A-2D, 3A-3D, 4A-4D, 5A-5D, 6A-6D, and 7A-7D.

FIG. 2B comprises a portion of FIG. 2 that depicts a user holding a device in one hand and pointing with the other.

FIG. 2D comprises a portion of FIG. 2 that depicts another user device with a wireless linkage to a base transceiver station (BTS), the BTS also having a wireless linkage to at least one of the devices of FIG. 2C.

FIG. 3A comprises a portion of FIG. 2 that depicts another user whose handheld device requests a phone call.

FIG. 3B comprises a portion of FIG. 2 that depicts a WLAN access point that communicates with devices of FIGS. 2C and 3A.

FIG. 3C comprises a portion of FIG. 2 that depicts a switch by which WLAN access points interact with a network.

FIG. 3D comprises a portion of FIG. 2 that depicts a base station controller (BSC).

FIG. 4A comprises a portion of FIG. 2 that depicts an access map server.

FIG. 4B comprises a portion of FIG. 2 that depicts another BSC.

FIG. 4D comprises a portion of FIG. 2 that depicts a subscriber status database.

FIG. 5A comprises a portion of FIG. 2 that depicts wireless linkage between an access map server and at least one mobile devices in a "free ride" zone.

FIG. 5B comprises a portion of FIG. 2 that depicts a BTS in communication with mobile devices.

FIG. 5C comprises a portion of FIG. 2 that depicts interfaces by which switches interact with the network.

FIG. 6D comprises a portion of FIG. 2 that depicts another MSC and BSC.

FIG. 7B comprises a portion of FIG. 2 that depicts other operational flows.

FIGS. 7C & 7D each comprise a portion of FIG. 2 that depicts a wearable device user.

DETAILED DESCRIPTION

Figure 1:
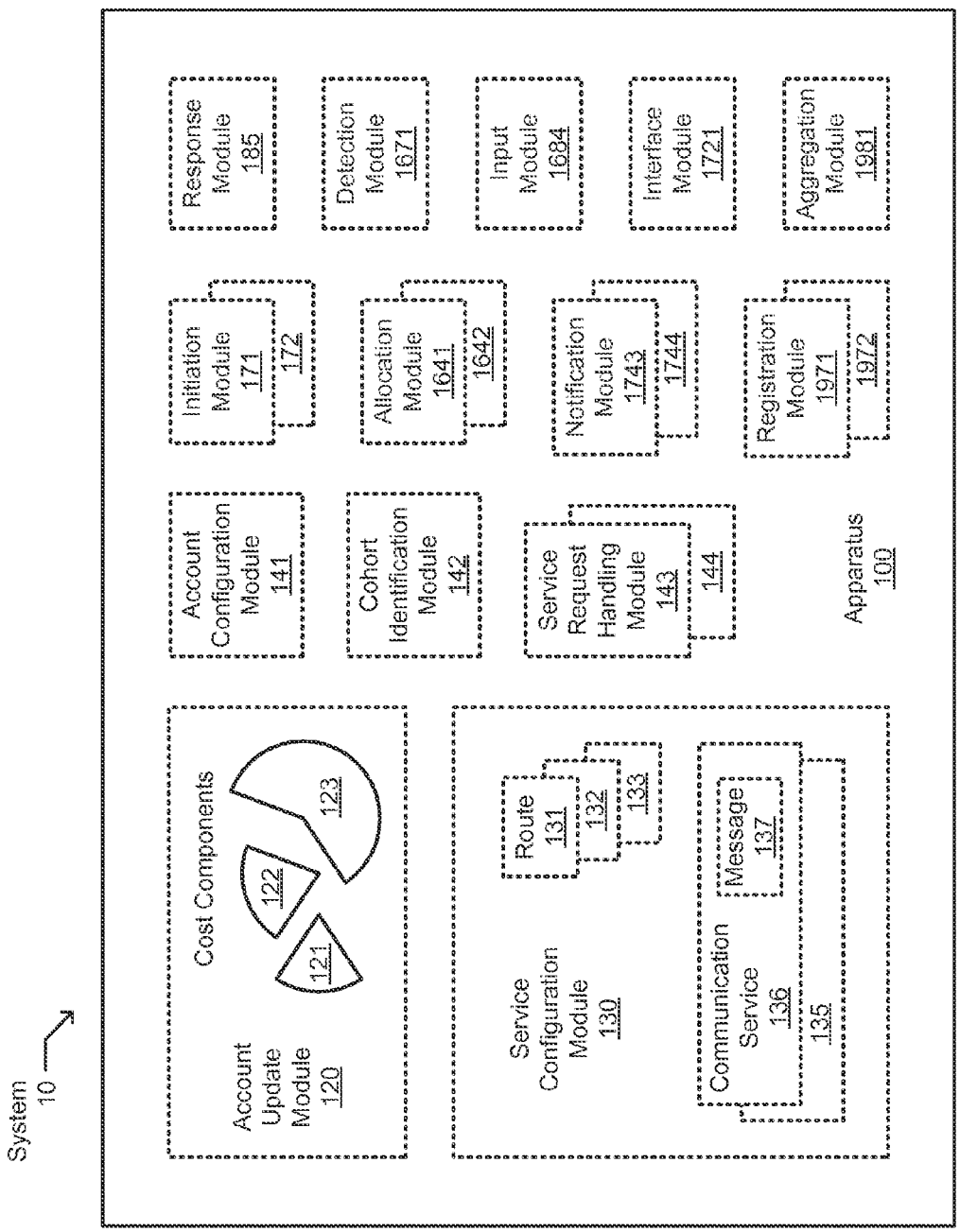
FIG. 1 depicts an exemplary environment in which one or more technologies may be implemented, including a schematic depiction of an apparatus.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

With reference now to FIG. 1, there is shown a system 10 comprising an apparatus 100 in which one or more technologies may be implemented. Apparatus 100 may include one or more instances of account update modules 120 each configured to allocate or otherwise handle cost components 121, 122, 123; of service configuration modules 130 configured to establish or update one or more routes 131, 132, 133 (a bidirectional interpersonal communication or other signal path via which one or more messages 137 or other communication services 135, 136 are implemented, e.g.); of account configuration modules 141; of cohort identification modules 142; of service request handling modules 143, 144; of initiation modules 171, 172; of response modules 185; of allocation modules 1641, 1642; of detection modules 1684; of input modules 1684; of interface modules 1721; of notification modules 1743, 1744; of registration modules 1971, 1972; or aggregation modules 1981 as described below.

Figure 2A:
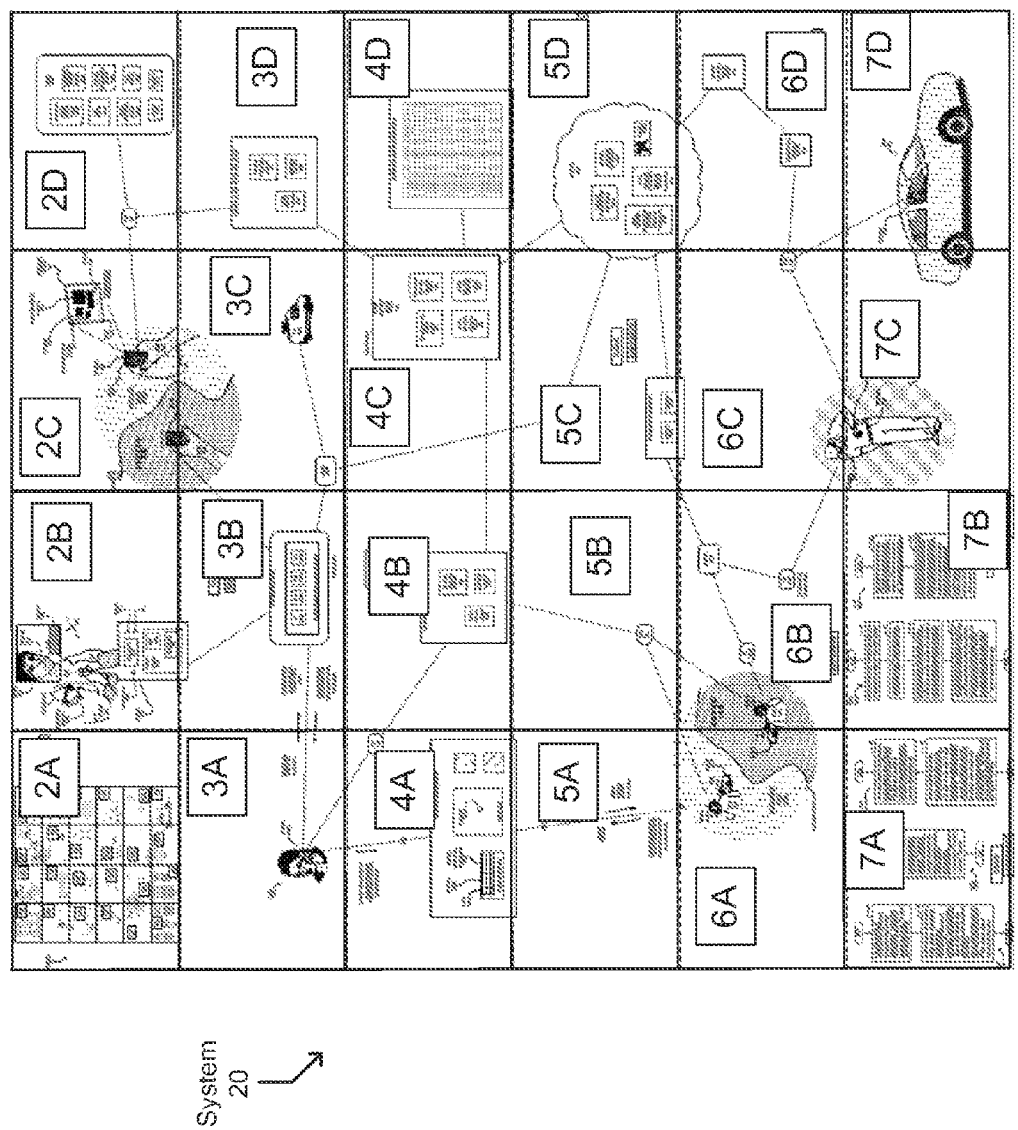
FIG. 2A depicts a 4×6 grid of thumbnails of the 24 respective sub-parts of FIG. 2.

With reference now to FIG. 2, there is shown a system 20 in or across which one or more instances of apparatus 100 or its components may be instantiated (in subsystems or mobile devices described below, e.g.) and in which one or more technologies may be implemented. FIG. 2 comprises a grid of 4 sheets by 6 sheets, the grid being summarized in a legend in FIG. 2A. FIG. 2 shows a partially schematic diagram of an environment(s) and/or an implementation(s) of technologies described herein. It is noted that FIG. 2 is a high-level environment diagram. As such, some elements of the system of FIG. 2 are expressed through the function they carry out. In such circumstances, these elements should be considered to include any combination of one or more program, microprocessor configuration, state machine, transistor-based event sequencing structure, firmware, field-programmable gate array ("FPGA") configuration, application programming interface ("API"), function, class, data structure, dynamically loaded library ("DLL"), database (e.g., SQL database), or other such special-purpose modules implemented in a structure or method eligible for patent protection under 35 U.S.C. §101.

U.S. patent application Ser. No. 13/317,989 ("Context-sensitive query enrichment") describes search protocols that are useful in a context of smartphones or similar mobile devices implementing wireless communication. As described with reference to FIG. 9 thereof and also to FIG. 2B herein, handheld interface device 962 permits a user to carry or otherwise support the device 962 as shown, while extending one or more of his fingers or arms 968 into a space where such limb can be detected (optically, e.g.) by the device 962. Moreover the user can effectively use one or more such limbs to indicate a three-dimensional region 903 containing one or more elements 931, 932 of interest to the user (on a poster 907 within sight of the user's facial region 901, e.g.). In some implementations device 962 also includes one or more microphones 941 or other sensors 951, 952 operable to capture one or more expressions 945 (in sounds in region 902, e.g.). Alternatively or additionally, one or more networks 1200 are operably coupled with device 962 (via access point 1820 and network interface 2300, e.g.) so that a face 981, character sequence 982, or other search pattern 983 (expressed digitally, e.g.) can be downloaded or recognized (e.g. in optical data from one or more sensors 951, 952). In some contexts, as described below, this permits one or more modules described herein (implementing one or more instances of a dialog manager in device 962 or network 1200, e.g.) to estimate a location of one or more regions, limbs, visible elements, or other such entities relative to one or more reference positions 925, 926.

With reference now to FIG. 18 of U.S. patent application Ser. No. 13/317,989, shown there is a high-level logic flow that includes recognizing a position of a first limb of a person in relation to a facial region of the person and to a three-dimensional region indicated by the first limb of the person, the three-dimensional region including a first informational element (e.g. an estimation module assigning two or more coordinates signaling a location of the person's finger, hand, or arm 968 in relation to a stationary or other frame of reference that can also signal respective locations of a facial region 901 of the person and a 3D region 903 that includes one or more informational elements 931, 932). This can occur, for example, in a context in which the 3D region 903 is farther than the arm 968 (in relation to the facial region 901 of the person) and in which the estimation module uses standard positioning coordinates (GPS with altitude, e.g.) or some other frame of reference in relation to which facial region 901 and 3D region 903 can be mathematically expressed. In some variants, for example, a handheld device 962 may include a first optical sensor 951 configured to capture first optical data (an image, e.g.) positionally related to one or more reference positions 925, 926 (located in device 962 or facial region 901 or some other frame of reference, e.g.) and a second optical sensor 952 configured to capture second optical data (another image, e.g.) positionally related to the same reference position(s) 925, 926 contemporaneously therewith (within a few seconds, e.g.). This can occur, for example, in a context in which "first" optical data indicates an approximate position of the facial region 901 of the person (in relation to device 962, e.g.) and in which "second" optical data indicates an approximate position of one or more elements 931, 932 in a 3D region toward which the person gestures (with a finger or arm 968, e.g.). In some variants, such an estimation module can perform this function using optical data obtained from only a single optical sensor 952. This can occur, for example, in a context in which device 962 is configured to be worn or held in facial region 901, establishing a reference position in the facial region. More generally, a limb position is known "in relation to" another entity (an item or region, e.g.) if each is assigned a specific location (expressed in coordinates or a natural language expression, e.g.) in a frame of reference common to both.

The logic flow also includes transmitting a search result relating to the first informational element and partly based on first auditory data from a vicinity of the person and partly based on the position of the first limb of the person in relation to the facial region of the person and to the three-dimensional region indicated by the first limb of the person (e.g. a statement module transmitting a result of a search task resulting from a search pattern 983 that includes a face 981 or character sequence 982 obtained from visible elements 931, 932 of the user's environment in response to auditory data from the same environment and to the region 903 indicated by the finger, hand, or arm 968). This can occur, for example, in a context in which the user's vicinity (region 902, e.g.) defines "the environment," in which the auditory data and one or more visible elements 931, 932 are both captured (respectively via microphone 941 and optical sensor 951, e.g.) in the same device 962; in which the indicated region 903 or auditory data may each trigger an exclusion or inclusion of one or more candidate elements; and in which search pattern 983 would otherwise have to be constructed by a more laborious process. In some contexts, for example, the auditory data may include a corroboratory expression 945 relating to one element (e.g. an utterance of "face" or "Smith" or "guy" or "who"). Alternatively or additionally, in some contexts, the auditory data may include timing data signaling that an audible event was detected while the user apparently looked at the "first" informational element. When implemented in conjunction with a cost-shifting or other mobile connectivity facilitation protocol as described herein, the flow in FIG. 18 of U.S. patent application Ser. No. 13/317,989 permits a cellular subscriber and another device user (with a mobile device that does not have an established cellular communications subscription account associated therewith, e.g.) to establish or maintain modes of communication service 136 (phone connections, e.g.) that permit collaborative investigation that would not otherwise exist. This can occur, for example, in a context in which device 962 participates in a delivery of messages 137 (search task descriptions or results, e.g.) or other communication services 135, 136 (as a cellular subscriber's device, e.g.) as described below.

In light of teachings herein, numerous existing techniques may be applied for configuring special-purpose circuitry or other structures effective for comparing a face or other informational element with a database of similar items as described herein without undue experimentation. See, e.g., U.S. Pat. No. 8,000,528 ("Method and apparatus for authenticating printed documents using multi-level image comparison based on document characteristics"); U.S. Pat. No. 7,949,191 ("Method and system for searching for information on a network in response to an image query sent by a user from a mobile communications device"); U.S. Pat. No. 7,908,518 ("Method, system and computer program product for failure analysis implementing automated comparison of multiple reference models"); U.S. Pat. No. 7,856,137 ("Apparatus and method for verifying image by comparison with template image"); U.S. Pat. No. 7,831,559 ("Concept-based trends and exceptions tracking"); U.S. Pat. No. 7,787,693 ("Text detection on mobile communications devices"); U.S. Pat. No. 7,644,055 ("Rule-based database object matching with comparison certainty"); U.S. Pat. No. 7,443,787 ("Cluster system, cluster member, and failure recovery method and program thereof"); U.S. Pat. No. 6,424,729 ("Optical fingerprint security verification using separate target and reference planes and a uniqueness comparison scheme"); U.S. Pat. No. 6,167,398 ("Information retrieval system and method that generates weighted comparison results to analyze the degree of dissimilarity between a reference corpus and a candidate document"); U.S. Pat. No. 6,134,014 ("Apparatus and method of inspecting phase shift masks using comparison of a mask die image to the mask image database").

Figure 2C:
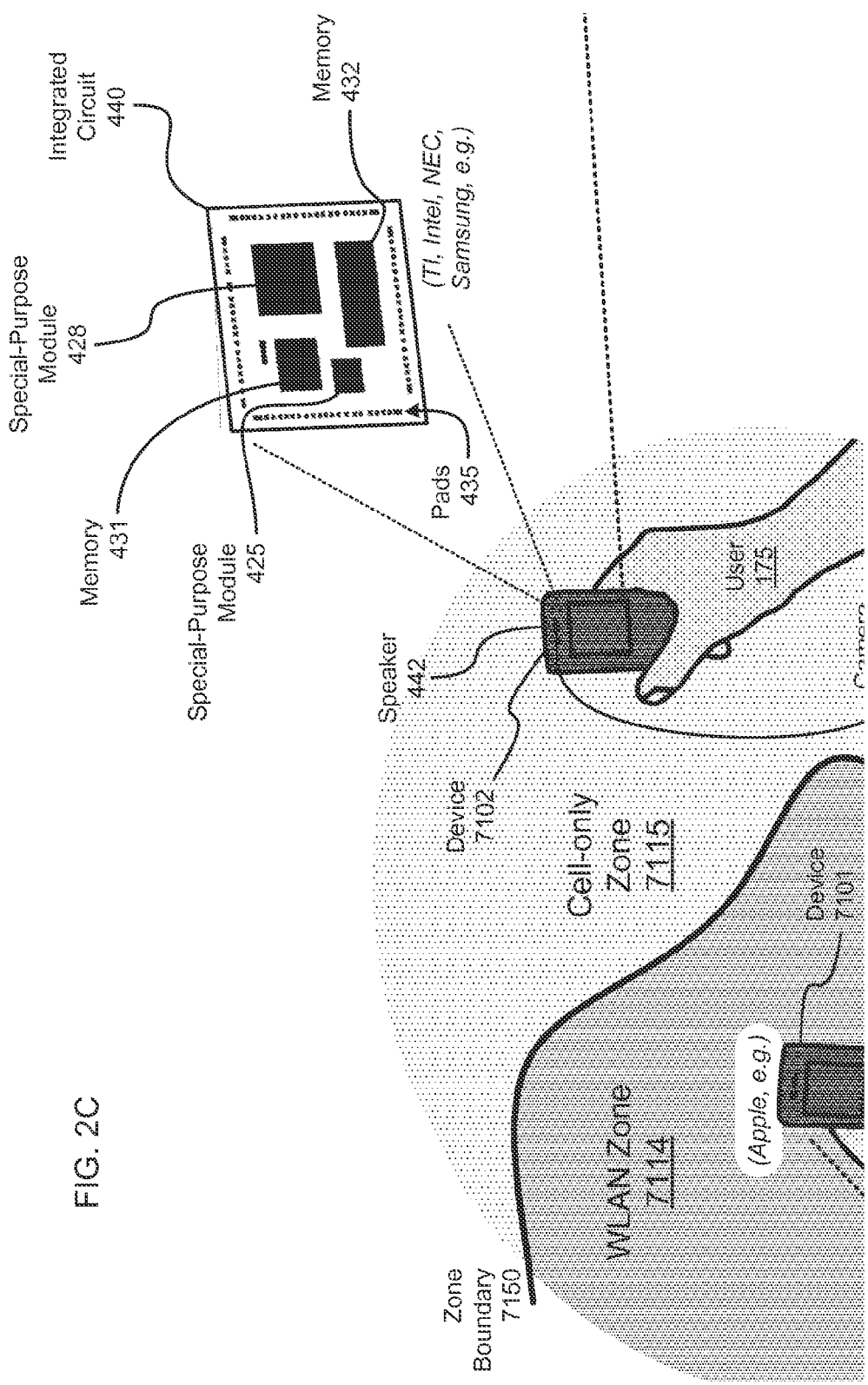
FIG. 2C comprises a portion of FIG. 2 that depicts one device in a cell-only zone and another device in a wireless local area network (WLAN) zone.

With reference now to FIG. 2C, there is shown a user 175 straddling a zone boundary 7150 separating a wireless local area network (WLAN) zone 7114 (including a smartphone or similar device 7101 able to use Wi-Fi, e.g.) from a cell-only zone 7115 (including a handheld device 7102 that cannot presently access any Wi-Fi hotspot but can communicate via a cellular network, e.g.). Device 7102 includes several externally visible features (speakers 442 and cameras 443, e.g.) and several internal features (an integrated circuit 440 having one or more memories 431, 432 and one or more special-purpose modules 425, 428) manufactured or otherwise configured to provide features described herein. In the interest of concision and according to standard usage in communication technologies, such features are set forth in natural language expressions. It will be understood by those skilled in the art that such expressions (functions or acts recited in English, e.g.) adequately describe structures identified below so that no undue experimentation will be required for their implementation. For example, any records or other informational data identified herein may easily be represented digitally as a voltage configuration on one or more electrical nodes (pads 435, e.g.) of an event-sequencing structure (transistor-based circuitry on an integrated circuit 440, e.g.) without any undue experimentation.

With reference now to FIG. 2D, there is shown a base transceiver station (BTS) 310 wirelessly coupled to device 7102 and also to device 1000. Device 1000 (a handheld device or passenger vehicle or communication satellite, e.g.) includes one or more subscriber identity modules (SIMs) 1011; frequency hopping modules 1013; transmitter/receiver modules 1014; channel management modules 1015; signal processing modules 1016; user interfaces 1017; encoders 1018; and decoders 1019. Except as noted, mobile wireless communication devices and subsystems depicted herein each include most or all of these components. In some cases, such components (SIMs, e.g.) may be readily removable or reconfigurable as described herein.

With reference now to FIG. 3D, there is shown a base station controller (BSC) 510 operably coupled (through a fiberoptic conduit, e.g.) with BTS 310. To facilitate control of one or more BTS's, as shown, BSC 510 may include one or more channel allocation modules 511; signal timing modules 513; and handover modules 518. BTS 310 and BSC 510 may typically be subsystems of a network operated by a cellular service provider (Verizon, e.g.).

With reference now to FIGS. 3B and 3C, there are shown a plurality of access points 1810, 1820 operably coupled (via a wireless linkage, e.g.) with and controlled by a switch 2110. Each such access point may be implemented as a wireless router, for example, through which mobile devices 962, 7101 may access a network 1200 (the Internet, e.g.).

With reference now to FIGS. 3A and 4A, there is shown another user 177, also operating a handheld device 2750. In some contexts, as described below, device 2750 may initiate a communication service (telephone call, e.g.) or may indicate its location via access point 1820. Also as described below, device 2750 may likewise initiate a communication service or may indicate its present location via a cellular network (including BTS 320, e.g.). In either case, or both, many such users may continually report indications of changes in service availability to one or more access map servers 2300 that aggregate such status data 2320 into regional service maps 2330, segments 2337 of which may then be provided selectively to devices in locations corresponding thereto.

With reference now to FIG. 4B, there is shown a base station controller (BSC) 520 configured to control BTS 320. It comprises one or more instances of channel allocation modules 521, signal timing modules 523, and handover modules 528 configured to facilitate operations described herein.

Figure 4C:
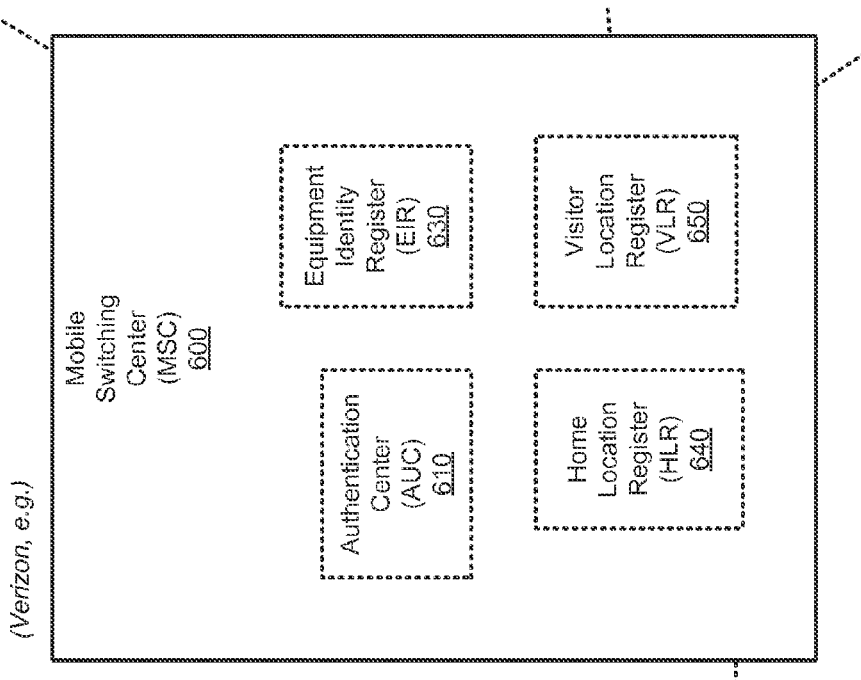
FIG. 4C comprises a portion of FIG. 2 that depicts a mobile switching center (MSC).

With reference now to FIG. 4C, there is shown a mobile switching center (MSC) 600 including one or more instances of authentication centers 610; equipment identity registers 630; home location registers 640; and visitor location registers 650. Such components of MSC 600 are each configured to interact with one or more instances of BSC 520 to facilitate operations as described herein.

With reference now to FIG. 4D, there is shown a subscriber database 680 (implemented within or otherwise operably coupled with MSC 600. Subscriber database 680 includes numerous records, for example, associating each device (identified as a field labeled "Cust_ID," e.g.) with a monthly allocation of minutes corresponding to a plan that the subscriber pays for; with a "balance" of remaining minutes available to that customer or device; and with an indicator of a remaining duration (in days, e.g.) until a replenishment of the "balance" will be applied.

Figure 5D:
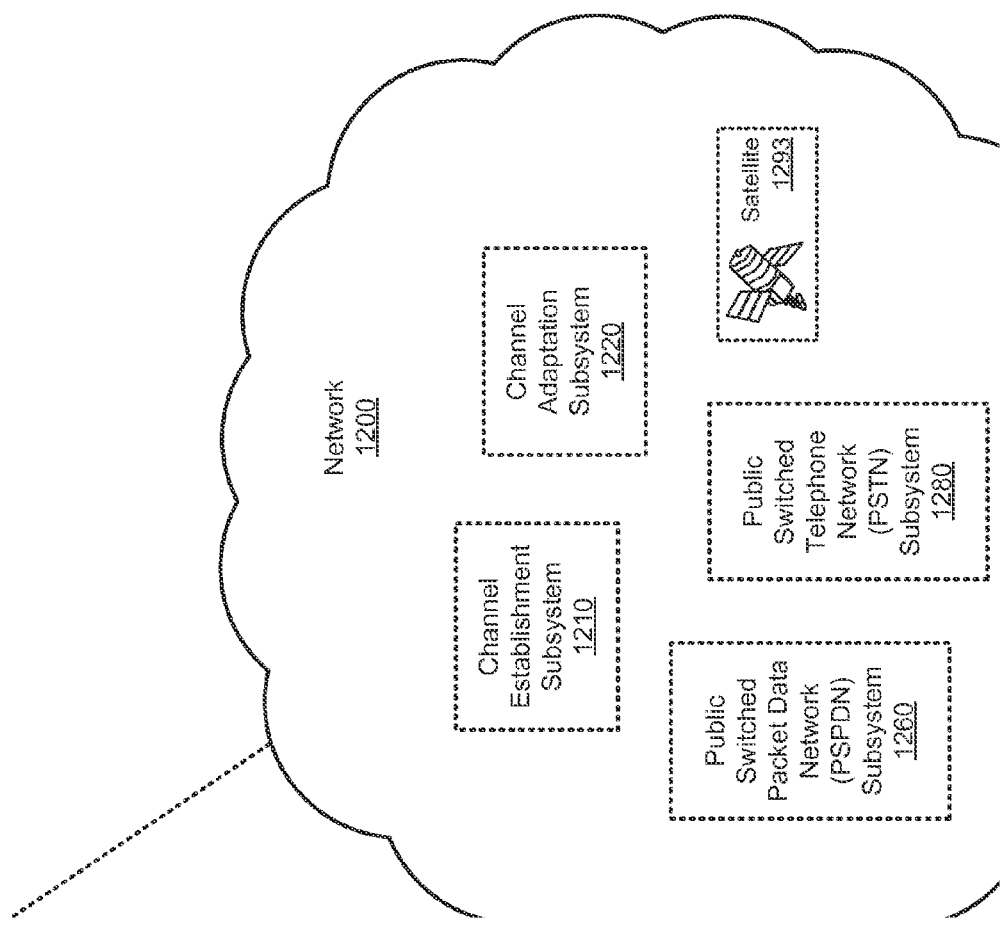
FIG. 5D comprises a portion of FIG. 2 that depicts the network.

With reference now to FIG. 5D, there is shown a network 1200 having one or more instance of channel establishment systems 1210; channel adaptation systems 1220; public switched packet data network (PSPDN) subsystems 1260; public switched telephone network (PSTN) subsystems 1260; or communication satellites 1293. Those skilled in the art will understand a variety of configurations of such networks and devices 1000 (satellite phones or radios, e.g.) served by them.

With reference now to FIG. 5C, there is shown network interfaces 2300 including one or more instances of network interfaces 2300, 2400 suitable for facilitating an interaction between network 1200 and WLAN access points (via switch 2110, e.g.). In some instances, such network interfaces include one or more instances of firewalls 2470 or high speed modems 2480.

Figure 6A:
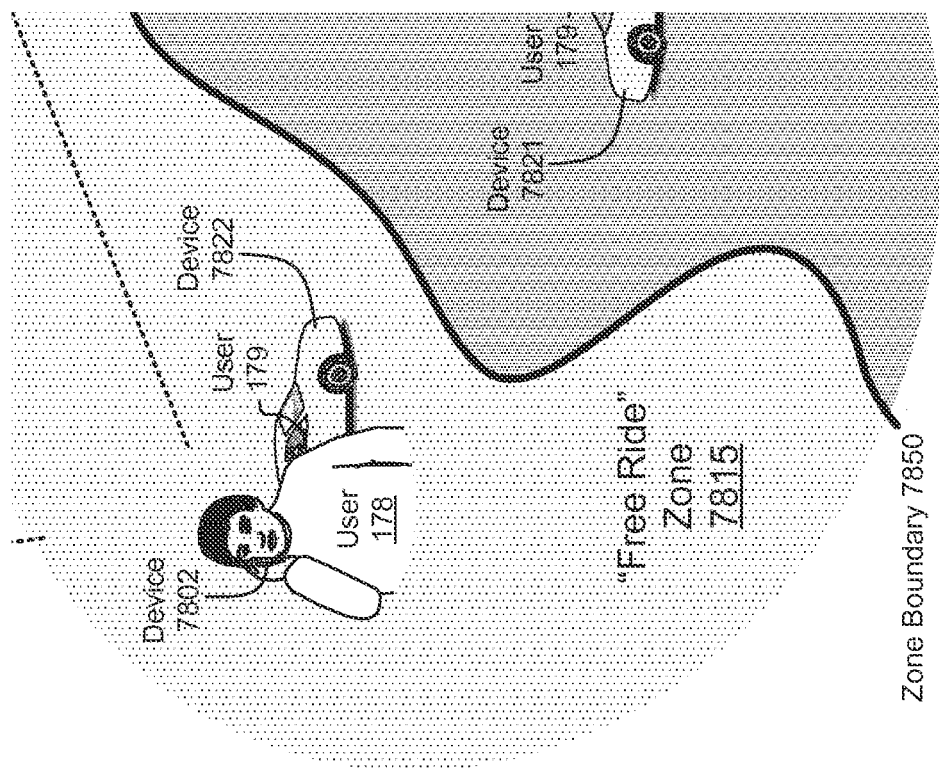
FIG. 6A comprises a portion of FIG. 2 that depicts device users in a "free ride" zone.

With reference now to FIGS. 5A, 5B, and 6A, users 178, 179 in a "free ride" zone 7815 accessible by a cellular network (including BTS 330, e.g.) are shown using mobile devices 7802, 7822. These users are not subscribers in any cellular network in contractual privity with the entity that owns BTS 330 and so do not pay for cellular service. Nevertheless under conditions described herein, one or more limited service as described herein may be provided to them. In response to a subscribing user 175 attempting to establish a communication service to a non-subscribing user, for example, the cellular network may transmit a map segment 2337 or other indications of nearby WLAN service availability (depicting WLAN zone 7214, e.g.). In some variants such information may be a real-time response to a service request from user 175. In others such information may be provided on a frequent basis (daily or more often, e.g.) in response to cohort identification module 142 receiving an indication that a subscribing user 175 has identified one or more devices 7802, 7822 used by the non-subscribing user(s). In some contexts, for example, cohort identification module 142 may accept a limited number of such device designations for each subscribing user. Alternatively or additionally, such indications of nearby WLAN service availability may be contingent on the one or more non-subscriber devices 7802, 7822 being configured to provide a service in return: to function as a hotspot, for example, or to report indications of changes in service availability (deviations from that indicated by map 2330, e.g.).

Figure 6B:
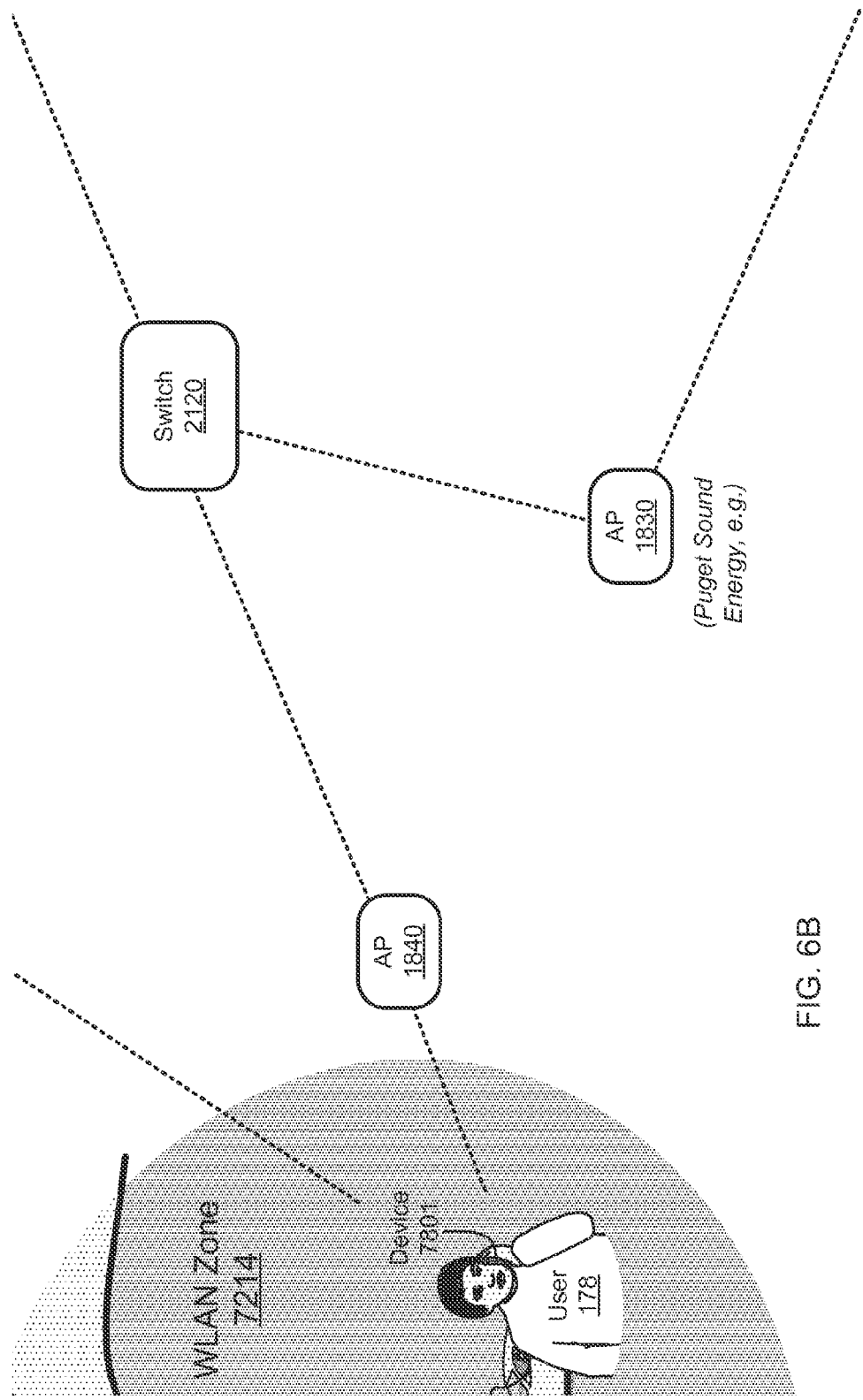
FIG. 6B comprises a portion of FIG. 2 that depicts device users in WLAN zone as well as a switch by which WLAN access points interact with the network.
Figure 6C:
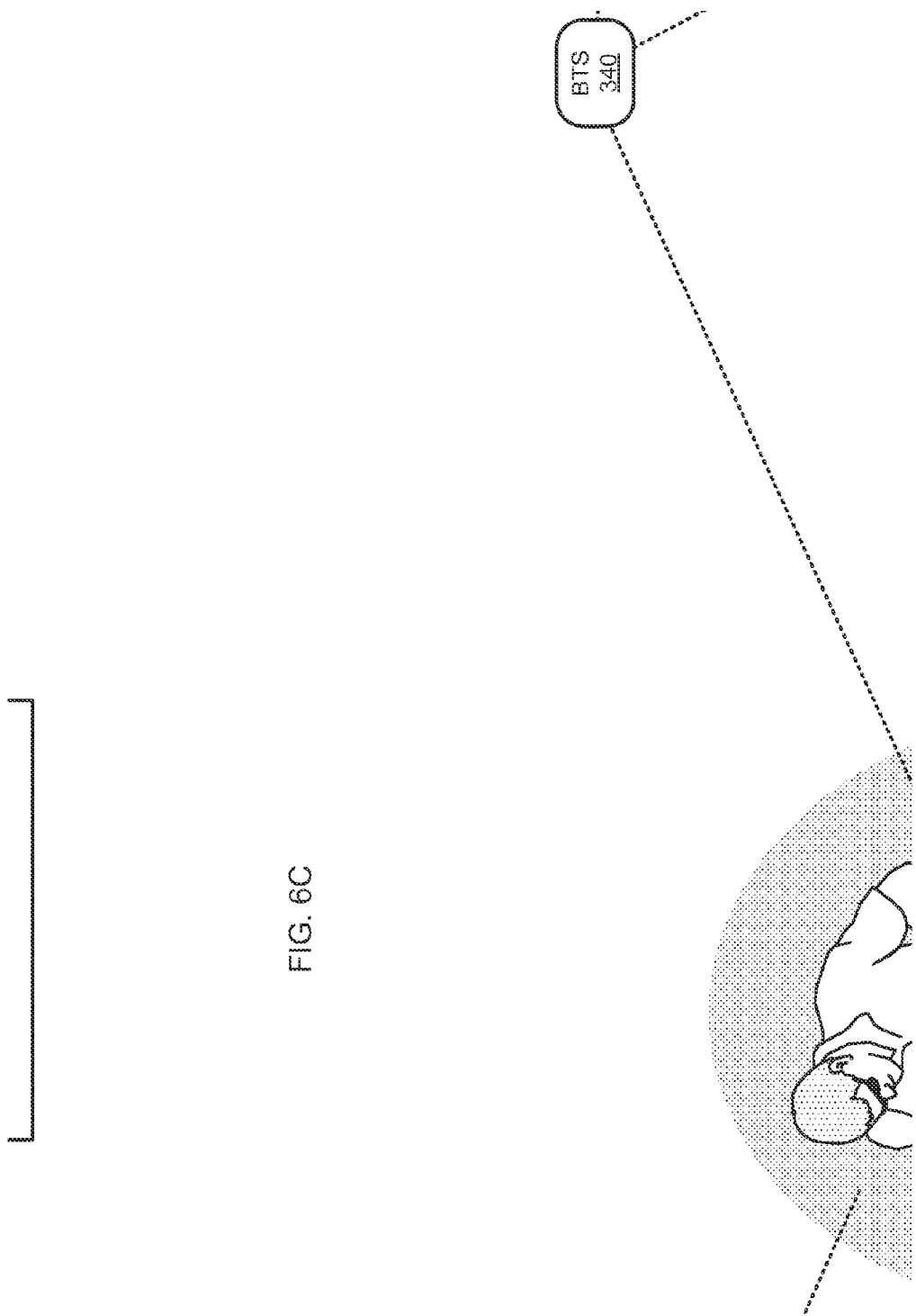
FIG. 6C comprises a portion of FIG. 2 that depicts another BTS.

With reference now to FIGS. 6B, 6C, and 6D, there are shown a plurality of access points 1830, 1840 connected with network interface 2400 via switch 2120. Also there is shown a BTS 340 operably coupled with network 1200 via BSC 510 and MSC 700.

In some variants, moreover, devices 7801, 7821 in WLAN zone 7214 (1) may be advised of an estimated position of, or imminent crossing of, a zone boundary 7850 or (2) may otherwise interact with an access map server 2300 (via base transceiver station 330 or via access point 1840, e.g.) in any of the modes described above. (One or more instances of access map server 2300 or other apparatuses 100 described herein for supervisory or supplemental functions may be implemented in any of several subsystems described herein, in or around network 1200.) In some variants, one or more access points 1810, 1820, 1830, 1840 may also be constructed and arranged to provide a fixed wireless linkage from a power meter to a network.

With reference now to FIG. 7D, there is shown a more magnified view of user 179 (showing a subsequent position east and south of WLAN zone 7214, e.g.) using a headset 355 operably coupled to interact (via BTS 340, e.g.) with network 1200 as shown. Likewise with reference to FIG. 7C, there is shown a user having wearable articles (eyewear 351 or a clip unit 353 or wristwear 538, e.g.) of which one or more may be configured without a transmit antenna but able to receive an RF signal. In respective embodiments, each such item may be configured to receive a signal (1) from a WLAN access point 1830 or (2) from a base transceiver station 340 or (3) from either when the respective wearable article is in a position to receive such signals.

Referring again to FIG. 1 with regard to the system 20 of FIG. 2, account configuration module 141 comprises special-purpose circuitry (a transistor-based event sequencing structure, e.g.) that associates or otherwise obtains an indication of an account (a quantification of "remaining minutes" or other available assets represented digitally, e.g.) associated with device 7101. User 175 (a cellular subscriber, e.g.) owns an account identified as 507779-7267 that has been linked to device 7101 (a smartphone, e.g.) as shown in subscriber status database 680. Account configuration module 141 interacts with subscriber status database 680 that indicates a monthly allocation of 500 minutes, 134 of which are currently available for use within the next 5 days as shown. User 175 will incur an excess-use penalty if more than 134 minutes are used within 5 days, but will receive 500 additional minutes at that time in a conventional manner.

Account update module 120 is likewise implemented as special-purpose circuitry that can, under some circumstances, debit the minute balance or otherwise allocate a cost component 131 (against the 134-minute balance or otherwise as an amount of currency, e.g.) of a communication service 36 (video call, e.g.) between device 7101 and one or more other devices 7801, 7802, 7822 that depends upon whether such other device is within WLAN service space (in WLAN zone 7214 or some other suitable hotspot, e.g.) or not. This can occur, for example, in a context in which such other device is not associated with any conventional wireless carrier (Verizon, e.g.), such as in which one or more users 178, 179 of such devices have cancelled their subscription. If two communication service participants 7101, 7801 are both within WLAN service space, service configuration module 130 establishes the communication service 136 between them along a non-cellular route 131 (such as via access points 1820, 1840; switches 2110, 2120; and network interfaces 2300, 2400). If user 175 is operating a device 7102 outside WLAN service space (in cell-only zone 7115, e.g.), service configuration module 130 establishes communication service 136 along a route 132 that is part cellular (from network 1200 to user 175, e.g.) and part non-cellular (from network 1200 to device 7801, e.g.). In this configuration, user 175 incurs a cost component 142 that does not depend upon user 178's presence in or absence from WLAN service space (consuming his minutes at his normal usage rate during premium "anytime minute" hours defined by his wireless carrier, e.g.). If users 175, 178 at both ends of a communication service 136 are outside WLAN service space (such as when using devices 7102, 7802), however, account update module 130 will charge user 175 at a higher rate (1.5 or 2.5 "minute" currency units per minute of call duration, e.g.) so that the non-subscribing user 178 (using device 7802, e.g.) can participate in the communication service without charge. This can occur, for example, in a context in which route 132 could otherwise not be established (via BTS 330, e.g.) and in which user 175 would otherwise have to wait for user 178 to re-enter WLAN service space even to get a unidirectional message 137 through to user 178.

If user 175 is inside WLAN service space and user 178 is not, service configuration module 130 will establish communication service 136 as a part-cellular route 133 (via BSC 520, MSC 600, switch 2110, and access point 1820, e.g.). This can occur, for example, in a context in which communication service 136 will only include a unidirectional message 137 (a ping or SMS text string, e.g.). In some variants, for example, a wireless carrier will only pass such messages toward the subscriber; in others, only messages from the subscriber will be passed; in still others, the charge for respective directions of message travel may be different.

In some variants, service configuration module 130 may decide, based on one or more indications of low network loading at the time of a user interaction, to permit user 175 to establish a voice call or even a video call as the communication service 136. At other times, service configuration module 130 may present to user 175 a "grayed" touchscreen button or other indication that such resource-intensive service is currently unavailable for interacting with non-subscribers through the cellular networks.

In some instances, account update module 120 may debit the account linked to device 7101 (identified as 507779-7267, e.g.) for a communication service 135 established even with a user 179 who is in WLAN service space. This can occur, for example, in a context in which the device 7821 being operated by user 179 is a passenger vehicle or when user 175 has provided an indication (as a menu selection on his device, e.g.) that a premium for cellular access to user 178 is desirable, whether user 175 is using his device 7101 within WLAN service space or using his device 7102 outside WLAN service space.

Figure 7A:
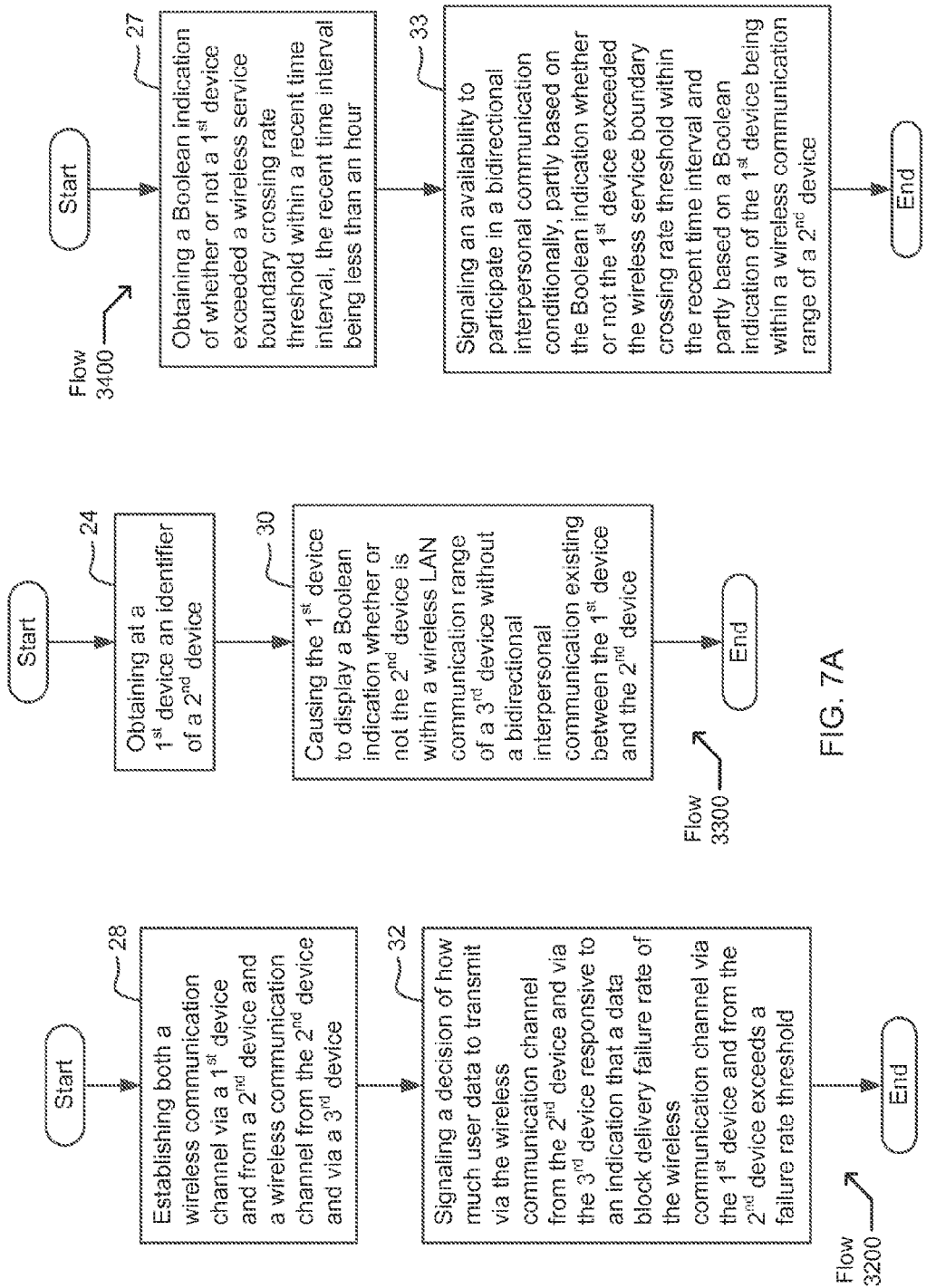
FIG. 7A comprises a portion of FIG. 2 that depicts operational flows.

With reference now to FIG. 7A, there is shown a high-level logic flow 3200 disclosed in FIG. 32 of U.S. patent application Ser. No. 13/731,907. Flow 3200 describes an operation 28 of establishing both a wireless communication channel via a first device and from a second device and a wireless communication channel from the second device and via a third device (e.g. initiation modules 171, 172 respectively creating parallel communication channels from device 7801, each including at least one wireless linkage). This can occur, for example, in a context in which base transceiver station 330 is the "first" device; in which device 7801 is the "second" device; in which access point 1840 is (an instance of) the "third" device; and in which at least two such parallel channels exist simultaneously at some time during the communication service. In a telephonic implementation, for example, (both or all) such channels may bear digitized auditory data simultaneously, optionally including a particular component of user data passing simultaneously through a primary channel through another channel.

Flow 3200 also describes an operation 32 of signaling a decision of how much user data to transmit via the wireless communication channel from the second device and via the third device responsive to an indication that a data block delivery failure rate of the wireless communication channel via the first device and from the second device exceeds a threshold (e.g. allocation module 1641 causing one or more transmission modules to increase a fraction of digitized auditory data transmitted the third device as an incremental response to an indication that a data block delivery failure rate via the first device exceeds a threshold). This can occur, for example, in a context in which the incremental response causes a partial reduction in a volume of data block delivery failure events and in which such wireless communication channel allocations would otherwise be made in a crude or unduly computation-intensive fashion (by conventional signal strength or load balancing or bit error rate indicia, e.g.). In some contexts, for example, allocation module 1641 may be configured to close a channel when a traffic volume through it becomes low enough (after several iterations of reduction, e.g.). When implemented in conjunction with a cost-shifting or other mobile connectivity facilitation protocol as described herein, flow 3200 permits a cellular subscriber and another device user (with a wearable article or other mobile device that does not have an established cellular communications subscription account associated therewith, e.g.) to establish or maintain routes of communication service 136 (phone connections or message delivery, e.g.) that would not otherwise exist.

With reference again to FIG. 7A, there is shown a high-level logic flow 3300 disclosed in FIG. 33 of U.S. patent application Ser. No. 13/731,907. Flow 3300 describes an operation 24 of obtaining at a first device an identifier of a second device (e.g. registration module 1971 maintaining a local instance of a contact list within device 7102 including a phone number or similar identification associated with user 178). This can occur, for example, in a context in which device 7102 is the "first" device; in which device 7802 is the "second" device; and in which a telephone switch or server (a mobile switching center 600 or similar subsystem in network 1200, e.g.) associates the phone number with one or more mobile devices operated by user 178.

Flow 3300 also describes an operation 30 of causing the first device to display a Boolean indication whether or not the second device is within a wireless local area network communication range of a third device without a bidirectional interpersonal communication existing between the first device and the second device (e.g. notification module 1744 triggering device 7102 to display a positive status indication signifying that device 7802 is within WLAN zone 7214 without first establishing a telephone call or similar bidirectional interpersonal communication between device 7102 and mobile device 7802). This can occur, for example, in a context in which WLAN zone 7214 is established as an operating range of access point 1840, e.g.); in which a user of device 7102 can initiate a telephone call or similar interpersonal communication to user 178 via device 7102 in response to one or more such indications; and in which user 178 would otherwise be unable to participate in such communication. When implemented in conjunction with a cost-shifting or other mobile connectivity facilitation protocol as described herein, flow 3300 permits a cellular subscriber and another device user (with a wearable article or other mobile device that does not have an established cellular communications subscription account associated therewith, e.g.) to implement a basic communication service 136 (a page or Boolean notification via an LED or earpiece/speaker, e.g.) that would not otherwise exist.

With reference again to FIG. 7A, there is shown a high-level logic flow 3400 disclosed in FIG. 34 of U.S. patent application Ser. No. 13/731,907. Flow 3400 describes an operation 27 of obtaining a Boolean indication of whether or not a first device exceeded a wireless service boundary crossing rate threshold within a recent time interval, the recent time interval being less than an hour (e.g. detection module 1671 generating a comparison result as a direct or indirect Boolean indication that a maximum crossing rate threshold was greater than an average rate at which a device 7822 had apparently crossed wireless service zone boundaries 7150, 7850 in a region during a particular time interval). This can occur, for example, in a context in which an aggregation module has received a series of several indications of crossing events; in which one or more of such indications was not "qualifying" (because it did not pertain to an event within the time interval, e.g.); in which the time interval is on the order of a second or of a minute; and in which detection module 1671 (comprising a comparator, e.g.) compares a count of such other indications with a threshold. In an implementation of detection module 1671 in which the threshold is four, for example, a count of three crossings will result in a negative indication (signifying infrequent crossings, e.g.). In another context (in which only service region departures are "qualifying," e.g.) detection module 1671 may generate a positive indication (signifying frequent crossings, e.g.) by applying a nominal threshold of two against a count of three (signifying a registration module detecting departure events, e.g.). Other variants of detection module 1671 may perform operation 27 using a variety of protocols. A crossing rate threshold may be effectively adapted by applying one or more offsets or multipliers to the count, for example, or by including other quantitative modifiers as described herein. Alternatively or additionally, detection module 1671 may implement conjunctive determinants, disjunctive determinants, or other such modes of implementing comparisons as indicated in U.S. patent application Ser. No. 13/731,907.

Flow 3400 also describes an operation 33 of signaling an availability to participate in a bidirectional interpersonal communication conditionally, partly based on the Boolean indication whether or not the first device exceeded the wireless service boundary crossing rate threshold within the recent time interval and partly based on a Boolean indication of the first device being within a wireless communication range of a second device (e.g. notification module 1743 causing a headset 355 or display to provide a user 175 with an automatic and conditional decision as to whether or not device 7822 is currently available to participate in a bidirectional interpersonal communication as communication service 136). This can occur, for example, in a context in which device 7822 is the "first" device; in which access point 1810 is the "second" device; in which the decision will be positive (signaling availability, e.g.) if device 7822 remains continuously within the wireless service zone for longer than the time interval; in which the time interval is on the order of a second or of a minute; and in which much more resource-intensive modeling (requiring frequent monitoring of satellite 1293 by a GPS module, e.g.) would otherwise be required to determine whether the first device is currently viable for such a communication. In some variants, moreover, determining availability by another mode (purely by a ground speed of device 7822 being low enough, e.g.) might generate false negatives unduly. The decision may (optionally) be signaled by a sound (a chord, e.g.) or by a word ("ready," e.g.) or other displayed symbol (a light-emitting diode coming on, e.g.), for example, or by other such expressions played or displayed in a vicinity of one or more users 175, 179, 180 (via eyewear 351, a clip unit 353, wristwear 358, a headset 355, or other wearable or other device described herein, e.g.). Some such devices may be configured for downlink only, or may be associated with a smartphone or similar device 1000 (via a personal area network technology in the ISM band from 2400-2480 MHz such as Bluetooth, e.g.) having a trackable location (by GPS, e.g.). Moreover in some embodiments a notification module may signal a positive decision by establishing the bidirectional interpersonal communication (comprising a video chat session or similar dialog, e.g.), moreover, or may signal a negative decision by doing nothing. When implemented in conjunction with a cost-shifting or other mobile connectivity facilitation protocol as described herein, flow 3400 permits a cellular subscriber and another device user (with a wearable article or other mobile device 7822 that does not have an established cellular communications subscription account associated therewith, e.g.) to implement various communication services 135, 136 (a teleconference or portion thereof, e.g.) describe above.

With reference now to FIG. 7B, there is shown a high-level logic flow 3500 disclosed in FIG. 35 of U.S. patent application Ser. No. 13/731,907. Flow 3500 describes an operation 26 of obtaining via a first device configuration data establishing a first security protocol (e.g. input module 1684 receiving via one or more linkages a secure access code effectively deeming one or more data patterns to be "acceptable"). This can occur, for example, in a context in which such linkages include a signal-bearing conduit (an antenna or optical cable, e.g.) as the "first" device, via which a configuration unit transmits an access code to a supervisor unit; and in which the access code includes a current password provided by a password generation module. In some contexts, for example, a secondary device remote from the supervisor unit may be configured to perform such transmissions regularly (daily, e.g.). Alternatively or additionally, one or more instances of a configuration unit may implement an initial security-protocol-implementing data pattern (during manufacture of the supervisor unit, e.g.) for limiting access to one or more services (network resources, e.g.) prior to any reconfiguration of the supervisor unit.

Flow 3500 also describes an operation 29 of obtaining via a second device a wireless signal containing access request data (e.g. interface module 1721 receiving a wireless signal containing access request data). This can occur, for example, in a context in which the "second" device is an antenna and in which device 2750 (in FIG. 3A) transmits a wireless signal as a response to input (key press events or voice commands, e.g.) from user 177 (initiating a telephone call, e.g.). Alternatively or additionally, device 2750 may transmit access request data (requesting to establish an open channel, e.g.) as an automatic response to device 2750 entering WLAN zone 7114 (comprising a wireless operating range of access point 1820, e.g.).

Flow 3500 also describes an operation 31 of signaling a decision whether or not to provide a first network access service via a third device responsive to whether or not the access request data in the wireless signal matches the first security protocol (e.g. registration module 1972 signaling a decision to provide device 2750 with a service that includes access to network 1200 via control module 3031 (in FIG. 3B) as an automatic and conditional response to an application module determining that access request data (a password, e.g.) matches a security-protocol-implementing data pattern).

Flow 3500 also describes an operation 35 of signaling a decision whether or not to provide a second network access service via the third device responsive to whether or not the access request data matches a second security protocol, the third device implementing a firewall between the first network access service and the second network access service (e.g. allocation module 1642 signaling a conditional decision not to provide an entity that transmits access request data with a service communication service 135 that includes access to network 1200 as an automatic and conditional response to an application module determining that access request data does not match security-protocol-implementing data pattern). This can occur, for example, in a context in which NAC unit 3030 is the "third" device; in which control module 3031 provides the "second" device with access to network 1200 (as the "first" network access service, e.g.); in which control module 3034 would simultaneously provide a "fourth" device 962 with access to network 1200 (as the "second" network access service, e.g.) if the "fourth" device had transmitted suitable access request data; and in which the "first" network access service would otherwise need to be provided by a "fifth" device (base transceiver station 320, e.g.). In some contexts, for example, control module 3032 may implement the firewall between the "first" and "second" network access services. Alternatively or additionally, control module 3033 may be remotely configurable (implemented in an FPGA or non-volatile memory, e.g.) to permit an adjustment of the location of the firewall or otherwise control an allocation of resources in NAC unit 3030. When implemented in conjunction with a cost-shifting or other mobile connectivity facilitation protocol as described herein, flow 3500 permits a cellular subscriber and another device user (with a wearable article or other mobile device 7822 that does not have an established cellular communications subscription account associated therewith, e.g.) to implement various communication services 135, 136 (a phone call or portion thereof, e.g.) that would not otherwise exist.

With reference again to FIG. 7B, there is shown a high-level logic flow 3600 disclosed in FIG. 36 of U.S. patent application Ser. No. 13/731,907. Flow 3600 describes an operation 25 of obtaining an indication of a first wireless communication service having been provided within a first service region by a first device at an earlier time (e.g. aggregation module 1981 receiving a notification that mobile device 7821 was at particular GPS coordinates three weeks ago at which time a wireless service had been established between device 7821 and network 1200 via access point 1830). This can occur, for example, in a context in which access point 1830 is the "first" device; in which a notification arrived at aggregation module 1981 almost three weeks ago; in which aggregation module 1981 maintains status data about the availability of wireless services within a region depicted by map 2330; and in which the status data includes an estimated position of access point 1830 (determined by a detection module using GPS or other triangulation protocols, e.g.) at the earlier time (three weeks ago, e.g.). In some contexts, for example, timing data (derived from a signal from an instance of device 7821 traveling across WLAN zones and maintained in status data 2320, e.g.) may indicate where Wi-Fi was operative as of three weeks ago. Alternatively or additionally, status data 2320 may include indications of "latest" wireless service status in several zones near the most-recent estimated position of access point 1830.

Flow 3500 also describes an operation 34 of signaling a decision whether or not to indicate the first wireless communication service being operative within the first service region as an automatic and conditional response to an indication from a second device of the first wireless communication service having been operative within the first service region or not at a later time (e.g. response module 185 communicating to user 175 a decision that is responsive to a recent indication from device 7802 about one or more WLAN services being operative or inoperative within a vicinity of user 180). This can occur, for example, in a context in which mobile device 7802 is the "second" device and has transmitted service availability information at the "later" time (yesterday, e.g.) of which some is maintained (in status data 2320, e.g.); in which the decision is "negative" if it results in device 7801 displaying a map version indicating that service is unavailable within part of a region; in which the decision is "positive" if it results in device 7801 displaying a map version indicating that WLAN service is available throughout the region; and in which user 175 would otherwise have to traverse the first service region personally to discover whether or not WLAN service is still available there. Alternatively or additionally, such signals from various devices 2750, 7101, 7801 traversing the region may be used (1) by a response module configured to determine an indication of an approximate range of each access point 1810, 1820, 1830; (2) by a response module configured to determine an indication of what times of the day or week a WLAN access point goes offline; (3) by a response module configured to determine a Boolean indication whether or not one of the access points 1810 appears to be stationary; (4) by a response module configured to determine a Boolean indication of whether or not one of the access points is substantially isotropic; (5) by a response module configured to display via a map of a user interface a cost-indicative service boundary relating to a prospective interpersonal communication; or (6) to perform such functions upon other devices described herein. When implemented in conjunction with a cost-shifting or other mobile connectivity facilitation protocol as described herein, flow 3600 permits a cellular subscriber and another device user (with a wearable article or other mobile device 7802 that does not have an established cellular communications subscription account associated therewith, e.g.) to implement various communication services 135, 136 (a phone call or portion thereof, e.g.) as described above.

In many contexts, a widespread implementation of one or more such flows 3200, 3300, 3400, 3500, 3600 into a wireless communications marketplace will entice cellular carriers to provide limited support for communications with anonymous devices (wearable articles operable to receive user data but not to send any user data, e.g.) or with devices belonging to non-subscribers as described herein. "Part cellular" calls as described above can facilitate offloading of a congested cellular network, for example. Interpersonal communications between users via alternatively technologies (direct interaction between a satellite 1293 and a satellite radio or mobile device 1000) may also achieve more widespread adoption. Moreover alternative wireless communication service providers (having much lower monthly subscription fees, e.g.) may enter the mobile marketplace on a larger scale.

Alternatively or additionally, in some variants, a cellular carrier subscriber (a telemarketer or other user 175, e.g.) may be able to configure his account to provide an additional enticement (in minutes or other currency, e.g.) for a user of another device to accept a communication. In some variants a recipient of a call or message 137 may require such enticement, or may set a threshold specifying a quantification (a threshold of $1 per call, e.g.) below which no communication service 136 can be established. Some variants may include a third party sponsor (a retailer, e.g.) who provides free access to participants in a part-cellular communication whenever one of the parties to the communication is at a specific retail location (a point of sale, e.g.).

In some contexts, a cellular carrier may permit communication services to non-subscribers only in contexts of very low usage (implementing a guardbanded local network loading threshold, for example, one that interrupts such service earlier than the loading threshold imposed upon subscribers, so that subscribers will effectively receive preferential access via MSC 600).

Referring again to FIG. 1 in light of scenarios described above, each such device may include an account update module 120 including or otherwise operably coupled (via a wireless linkage, e.g.) with other depicted components of apparatus 100. Cohort identification module 142, for example, may be configured to allocate one or more cost components to a subscriber account, as described above, as an automatic and conditional response to one or more communication services 135, 136 being initiated. In some variants, moreover, such services may not result in any cost component thereof being allocated to the non-subscribing user who participates in the communication. In some variants, service request handling module 143 may likewise allocate such cost components to a subscribing user as an automatic and conditional response to the non-subscriber's device initiating the communication service. This can occur in a context in which the subscribing user authorized such communication earlier, for example, or in response to a prompt provided at the time of the service request. Alternatively or additionally a service request handling module 144 (an anonymous incoming call handling module, e.g.) may initiate such communication services without having received any indication of a participating device 1000 being associated with any account.

In light of teachings herein, numerous existing techniques may be applied for configuring special-purpose circuitry or other structures effective for cost allocations as described herein without undue experimentation. See, e.g., U.S. Pat. No. 8,311,532 ("Method and system for enabling personalized shared mobile phone usage"); U.S. Pat. No. 7,813,716 ("Method of providing information to a telephony subscriber"); U.S. Pat. No. 6,788,927 ("Financing party payment for calls with a wireless subscriber"); U.S. Pat. Pub. No. 2012/0202454 ("System and method for authorizing and monetizing collect cellular telephone calls"); U.S. Pat. Pub. No. 2011/0191205 ("Portable communicator"); U.S. Pat. Pub. No. 2009/0227229 ("Method and system for enabling personalised shared mobile phone usage"); U.S. Pat. Pub. No. 2008/0167045 ("Service handover control apparatus using an end-to-end service handover and method using the apparatus"); and U.S. Pat. Pub. No. 2005/0190902 ("Network support for billing customer calls according to tailored billing lists").

In light of teachings herein, moreover, numerous existing techniques may be applied for configuring special-purpose circuitry or other structures effective for configuring a wearable article for user-initiated communication as described herein without undue experimentation. See, e.g., U.S. Pat. No. 8,340,476 ("Electronic acquisition of a hand formed expression and a context of the expression"); U.S. Pat. No. 8,234,262 ("Method of selecting a second content based on a user's reaction to a first content of at least two instances of displayed content"); U.S. Pat. No. 8,150,796 ("Methods and systems for inducing behavior in a population cohort"); U.S. Pat. No. 8,126,867 ("Returning a second content based on a user's reaction to a first content"); U.S. Pat. No. 8,104,892 ("Vision modification with reflected image"); U.S. Pat. No. 8,094,009 ("Health-related signaling via wearable items"); U.S. Pat. No. 8,065,404 ("Layering destination-dependent content handling guidance"); U.S. Pat. No. 7,930,389 ("Adaptive filtering of annotated messages or the like"); and U.S. Pat. No. 7,733,223 ("Effectively documenting irregularities in a responsive user's environment").

All of the patents and other publications referred to above are incorporated herein by reference generally—including those identified in relation to particular new applications of existing techniques—to the extent not inconsistent herewith (in each respective latest edition, where applicable). While various system, method, article of manufacture, or other embodiments or aspects have been disclosed above, also, other combinations of embodiments or aspects will be apparent to those skilled in the art in view of the above disclosure. The various embodiments and aspects disclosed above are for purposes of illustration and are not intended to be limiting, with the true scope and spirit being indicated in the final claim set that follows.

What is claimed is:

1. A system comprising:
   circuitry configured for obtaining an indication of an account associated with a first mobile device;
   circuitry configured for receiving an indication whether a second mobile device is within a wireless local area network (WLAN) service space;
   circuitry configured for receiving an indication whether the first mobile device is within the WLAN service space;
   circuitry configured for establishing a communication service between the first mobile device and the second mobile device that is initiated by the first mobile device responsive the indication whether the first mobile device is within the WLAN service space;
   circuitry configured for allocating a first communication service cost component to the account associated with the first mobile device when the second mobile device is within the WLAN service space;
   circuitry configured for allocating a second communication service cost component different from the first communication service cost component to the account associated with the first mobile device when the second mobile device is not within the WLAN service space; and
   circuitry configured for allocating a third communication service cost component different from the first communication service cost component and the second communication service cost component to the account associated with the first mobile device when the first mobile device and the second mobile device are not within the WLAN service space.

2. The system of claim 1, wherein the first mobile device is a smartphone.

3. The system of claim 1, wherein the circuitry configured for obtaining an indication of an account associated with a first mobile device includes:

circuitry configured for obtaining an indication of an account associated with a first mobile device from at least one removable subscriber identity module (SIM) card.

4. The system of claim 1, wherein the second mobile device includes a passenger vehicle.

5. The system of claim 1, further comprising:
circuitry configured for obtaining an indication from a user of the first mobile device that the second communication service cost component is authorized.

6. The system of claim 1, further comprising:
circuitry configured for establishing a wireless communication channel from the second mobile device via a base transceiver station;
circuitry configured for establishing a wireless communication channel from the second mobile device via a WLAN access point; and
circuitry configured for signaling a decision of how much user data to transmit via the wireless communication channel from the second mobile device via the WLAN access point responsive to an indication that a data block delivery failure rate of the wireless communication channel from the second mobile device via the base transceiver station exceeds a threshold.

7. The system of claim 5, further comprising:
circuitry configured for obtaining at the first mobile device an identifier of the second mobile device; and
circuitry configured for causing the first mobile device to display at least one indication whether the second mobile device is within a communication range of a WLAN access point without a bidirectional interpersonal communication existing between the first mobile device and the second mobile device.

8. The system of claim 1, further comprising:
circuitry configured for obtaining at least one indication of whether the second mobile device exceeded a wireless service boundary crossing rate threshold within a time interval; and
circuitry configured for signaling an availability to participate in a bidirectional interpersonal communication conditionally, at least partly based on the indication whether the second mobile device exceeded the wireless service boundary crossing rate threshold within the time interval.

9. The system of claim 1, wherein the circuitry configured for establishing a communication service between the first mobile device and the second mobile device that is initiated by the first mobile device includes:
circuitry configured for configuring the communication service between the first mobile device and one or more other devices as a part-cellular call.

10. The system of claim 1, wherein the circuitry configured for establishing a communication service between the first mobile device and the second mobile device that is initiated by the first mobile device includes:
circuitry configured for configuring a WLAN access point to support the communication service between the first mobile device and the second mobile device whenever the first mobile device or the second mobile device is at a specific retail location.

11. The system of claim 1, further comprising:
circuitry configured for implementing a guard banded local network loading threshold.

12. The system of claim 1, further comprising:
circuitry configured for configuring a cohort identification module to allocate the communication service cost component to the account associated with the first mobile device responsive to the communication service between the first mobile device and the second mobile device.

13. The system of claim 1, wherein the first communication service cost component includes:
a debit to a call minute balance at a first rate, and wherein the second communication service cost component different from the first communication service cost component includes:
a debit to the call minute balance at a second rate higher than the first rate.

14. The system of claim 1, wherein the first communication service cost component includes:
a monetary charge at a first rate, and wherein the second communication service cost component different from the first communication service cost component includes:
a monetary charge at a second rate higher than the first rate.

15. The system of claim 1, wherein the circuitry configured for allocating a third communication service cost component different from the first communication service cost component and the second communication service cost component to the account associated with the first mobile device when the first mobile device and the second mobile device are not within a WLAN service space includes:
circuitry configured for allocating a third communication service cost component higher than the first communication service cost component and the second communication service cost component to the account associated with the first mobile device when the first mobile device and the second mobile device are not within a WLAN service space.

16. The system of claim 1, wherein the circuitry configured for obtaining an indication of an account associated with a first mobile device includes:
at least one of:
circuitry configured for including an identifier of the first mobile device as a voltage configuration on one or more electrical nodes, the indication of the account comprising the identifier of the first mobile device; or
circuitry configured for causing a subscriber status database to include an account identifier, an allocation, and a remaining balance in a database record digitally represented as a voltage configuration on one or more electrical nodes.

17. The system of claim 1, further comprising:
circuitry configured for obtaining an indication of WLAN service having been provided within a first service region by a third mobile device at an earlier time; and
circuitry configured for signaling a decision whether to indicate the WLAN service being operative within the first service region as an automatic and conditional response to an indication from a fourth mobile device of the WLAN service having been operative within the first service region at a later time.

18. A system comprising:
means for obtaining an indication of an account associated with a first mobile device;
means for receiving an indication whether a second mobile device is within a wireless local area network (WLAN) service space;
means for receiving an indication whether the first mobile device is within the WLAN service space;
means for establishing a communication service between the first mobile device and the second mobile device that is initiated by the first mobile device responsive the indication whether the first mobile device is within the WLAN service space;

means for allocating a first communication service cost component to the account associated with the first mobile device when the second mobile device is within the WLAN service space;

means for allocating a second communication service cost component different from the first communication service cost component to the account associated with the first mobile device when the second mobile device is not within the WLAN service space; and means for allocating a third communication service cost component different from the first communication service cost component and the second communication service cost component to the account associated with the first mobile device when the first mobile device and the second mobile device are not within the WLAN service space.

19. A method comprising:

obtaining an indication of an account associated with a first mobile device;

receiving an indication whether a second mobile device is within a wireless local area network (WLAN) service space;

receiving an indication whether the first mobile device is within the WLAN service space;

establishing a communication service between the first mobile device and the second mobile device that is initiated by the first mobile device responsive the indication whether the first mobile device is within the WLAN service space;

allocating a first communication service cost component to the account associated with the first mobile device when the second mobile device is within the WLAN service space;

allocating a second communication service cost component different from the first communication service cost component to the account associated with the first mobile device when the second mobile device is not within the WLAN service space; and allocating a third communication service cost component different from the first communication service cost component and the second communication service cost component to the account associated with the first mobile device when the first mobile device and the second mobile device are not within the WLAN service space.

20. A system comprising:

circuitry configured for obtaining an indication of an account associated with a first mobile device;

circuitry configured for receiving an indication whether a second mobile device is within a wireless local area network (WLAN) service space;

circuitry configured for establishing a communication service between the first mobile device and the second mobile device that is initiated by the first mobile device responsive the indication whether the first mobile device is within the WLAN service space including establishing only a unidirectional communication service between the first mobile device and the second mobile device when the second mobile device is not within a WLAN service space;

circuitry configured for allocating a first communication service cost component to the account associated with the first mobile device when the second mobile device is within the WLAN service space; and circuitry configured for allocating a second communication service cost component different from the first communication service cost component to the account associated with the first mobile device when the second mobile device is not within the WLAN service space.

* * * * *

UNITED STATES PATENT AND TRADEMARK OFFICE
CERTIFICATE OF CORRECTION

PATENT NO. : 9,693,214 B2  
APPLICATION NO. : 13/839536  
DATED : June 27, 2017  
INVENTOR(S) : Roderick A. Hyde et al.

Page 1 of 1

It is certified that error appears in the above-identified patent and that said Letters Patent is hereby corrected as shown below:

In the Claims

In Column 17, Line 25, Claim 7 "The system of claim 5, further comprising:" should be -- The system of claim 1, further comprising: --

Signed and Sealed this  
Fifth Day of September, 2017

Joseph Matal  
*Performing the Functions and Duties of the*  
*Under Secretary of Commerce for Intellectual Property and*  
*Director of the United States Patent and Trademark Office*